(12) United States Patent  
Bolshtyansky et al.

(10) Patent No.: US 8,699,125 B2  
(45) Date of Patent: Apr. 15, 2014

(54) RECONFIGURABLE OPTICAL AMPLIFIER

(75) Inventors: Maxim Bolshtyansky, East Windsor, NJ (US); Gregory Cowle, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 778 days.

(21) Appl. No.: 12/899,402

(22) Filed: Oct. 6, 2010

(65) Prior Publication Data

US 2011/0085231 A1 Apr. 14, 2011

Related U.S. Application Data

(63) Continuation-in-part of application No. 12/370,556, filed on Feb. 12, 2009, now Pat. No. 8,233,214.

(60) Provisional application No. 61/249,007, filed on Oct. 6, 2009, provisional application No. 61/028,429, filed on Feb. 13, 2008.

(51) Int. Cl.  
*H01S 3/091* (2006.01)

(52) U.S. Cl.  
USPC .................................. 359/341.3; 359/349

(58) Field of Classification Search  
USPC .................................. 359/349, 341.3; 385/16  
See application file for complete search history.

(56) References Cited

U.S. PATENT DOCUMENTS

| | | | |
|---|---|---|---|
| 5,050,949 A | 9/1991 | DiGiovanni et al. | 359/337.4 |
| 5,181,134 A * | 1/1993 | Fatehi et al. | 398/56 |
| 5,355,248 A | 10/1994 | Hadjifotiou | 359/341.3 |
| 5,406,411 A | 4/1995 | Button et al. | 359/341.33 |
| 5,555,127 A | 9/1996 | Abdelkader et al. | 359/341.1 |
| 5,561,552 A | 10/1996 | Shibuya | 359/341.33 |
| 5,778,132 A | 7/1998 | Csipkes et al. | 385/135 |
| 5,991,069 A | 11/1999 | Jander | 359/337 |
| 6,011,645 A | 1/2000 | Hong | 359/337.5 |
| 6,134,047 A | 10/2000 | Flood et al. | 359/337.12 |
| 6,313,938 B1 | 11/2001 | Shikii et al. | 359/333 |
| 6,344,911 B1 | 2/2002 | Dailey, Jr. et al. | 398/82 |
| 6,384,965 B2 | 5/2002 | Akiyama | 359/341.4 |
| 6,388,806 B1 | 5/2002 | Freeman et al. | 359/341.3 |
| 6,445,493 B2 | 9/2002 | Kohnke et al. | 359/337.1 |
| 6,563,630 B1 | 5/2003 | Jacob et al. | 359/341.2 |
| 6,580,552 B2 | 6/2003 | Welch | 359/341.32 |
| 6,603,896 B1 | 8/2003 | MacCormack et al. | 385/24 |
| 6,658,189 B2 | 12/2003 | Ajima et al. | 385/123 |
| 6,839,163 B1 | 1/2005 | Jakobson et al. | 359/341.1 |

(Continued)

OTHER PUBLICATIONS

"PLC-Optical circulator and isolator based on blazed diffraction grating" by Sonobe, L. Fujita, H. in Transducers, Solid-State Sensors, Actuators and Microsystems, Jun. 2003.

*Primary Examiner* — Mark Hellner  
(74) *Attorney, Agent, or Firm* — Matthew A. Pequignot; Pequignot + Myers LLC

(57) ABSTRACT

A reconfigurable optical amplifier is formed of a plurality of optical switches and a plurality of fiber amplifier sections to provide a switchable amplifying network. A variable pump splitter provides pump light from an optical pump source to two or more fiber amplifier sections. The optical switches and variable pump splitters are formed in a planar lightwave circuit, which may further include pump WDM combiners, variable optical attenuators, tap couplers and other optical components, and to which monitoring photodiodes and the fiber amplifier sections are coupled. A same PLC can be used for a wide variety of reconfigurable optical amplifiers.

18 Claims, 16 Drawing Sheets

(56) References Cited

U.S. PATENT DOCUMENTS

| | | |
|---|---|---|
| 6,917,731 B2 | 7/2005 | Bennett et al. ............. 385/15 |
| 6,922,281 B2 | 7/2005 | Pan et al. ............. 359/341.1 |
| 6,937,385 B2 | 8/2005 | Bennett et al. ............. 359/333 |
| 6,961,502 B1 | 11/2005 | Wysocki et al. ............. 385/129 |
| 7,006,280 B2 | 2/2006 | Huang et al. ............. 359/337.1 |
| 7,023,612 B2 | 4/2006 | Ghera et al. ............. 359/337.4 |
| 7,072,100 B2 | 7/2006 | Nishihara et al. ............. 359/337.2 |
| 7,162,108 B2 | 1/2007 | Sala et al. ............. 385/2 |
| 7,224,517 B2 | 5/2007 | Sugaya et al. ............. 359/337.4 |
| 7,295,365 B2 | 11/2007 | Sommer et al. ............. 359/341.32 |
| 7,460,298 B2 | 12/2008 | Li et al. ............. 359/341.32 |
| 2004/0100684 A1* | 5/2004 | Jones et al. ............. 359/337.11 |
| 2005/0276563 A1* | 12/2005 | Faure et al. ............. 385/140 |
| 2007/0291358 A1 | 12/2007 | Colbourne et al. |
| 2009/0071948 A1* | 3/2009 | Matsuda et al. ............. 219/121.78 |
| 2009/0201576 A1 | 8/2009 | Bolshtyansky et al. ............. 359/341.33 |

* cited by examiner

RECONFIGURABLE OPTICAL AMPLIFIER

CROSS-REFERENCE TO RELATED APPLICATIONS

The present invention claims priority from U.S. provisional Patent Application No. 61/249,007 filed Oct. 6, 2009, entitled "Reconfigurable PLC EDFA", which is incorporated herein by reference. It is a continuation-in-part of the U.S. Patent Application Ser. No. 12/370,556, filed Feb. 12, 2009, entitled "Optical fiber amplifier and a control method therefor", now U.S. Pat. No. 8,233,214, which claims priority from U.S. Patent Application No. 61/028,429 filed Feb. 13, 2008, entitled "Novel Components In Relation To PLC Amplifier", which are incorporated herein by reference.

TECHNICAL FIELD

The present invention relates generally to optical amplifiers, and more particularly relates to reconfigurable optical amplifiers for use in optical communication systems.

BACKGROUND OF THE INVENTION

A typical transmission link of an optical fiber communication system contains various optical amplifiers, in particular various erbium doped fiber amplifiers (EDFAs), which may play different roles depending on their location in the link. Accordingly, the link may have multiple types of EDFAs with differing configurations and/or specifications. A typical EDFA specification includes target values or ranges for such parameters as ADFA gain (G), noise figure (NF), gain tilt and gain ripple. All these parameters may have different target ranges depending on a position of the EDFA in the link, thereby necessitating differing amplifier designs.

By way of example, FIG. 1 schematically illustrates a portion of a conventional transmission link of a long-haul optical network, in which an EDFA 9-1 is a booster amplifier that boosts the power of an optical signal from an optical signal transmitter 6 to a target optical power for launching into a transmission span 13-1. Typically, EDFA 9-1 is a single stage amplifier that has only two optical connections, i.e. input and output. EDFA 9-2 compensates the loss in the optical signal from the transmission span; and also compensates dispersion, caused by the transmission fiber, by passing the signal through a dispersion compensation unit (DCU) 8-1. EDFA 9-2 is typically referred to as a dual stage amplifier or an amplifier with a mid-stage access. The DCU 8-1 is considered to be connected between gain stages or "at midstage". The EDFA 9-2 has at least four optical connections: amplifier input, amplifier output, midstage input and midstage output. EDFA 9-3 is similar to EDFA 9-2 as it compensates for an optical loss and chromatic dispersion in transmission fiber, and is also a two stage amplifier with midstage access. DCU 8-2 may have different characteristics, or even may be based on a different technology. Furthermore, loss-span compensation, gain flatness and noise figure requirements to the EDFA 9-3 can be significantly different from requirements to EDFA 9-2, as well. EDFA 9-4 and EDFA 9-5 are single stage booster amplifiers located after Reconfigurable Optical Add/Drop Module (ROADM) 7, and while they are similar to EDFA 9-1 in function and the number of amplification stages, they are located in different part of the transmission link, and as a result gain, noise and flatness requirements to EDFA 9-4 and 9-5 can be quite different from that of EDFA 9-1.

Thus, different optical amplifiers may have different specifications and require different number of stages and connections. While some of the amplifier parameters can be adjusted in conventional amplifiers, such as amplifier gain, such adjustment is limited in range due to its influence on other parameters, for example reducing the gain of an EDFA typically decreases the noise figure, while increasing the gain beyond a design-dependent optimal value may adversely affect the gain flatness or tilt.

A conventional way of dealing with this problem is to fabricate different amplifiers in a variety of configurations designed to different specifications. To illustrate this, FIG. 2 shows different exemplary NF-Gain characteristics of the four EDFAs in FIG. 1. As an example, EDFA 9-1 could be of configuration 1, EDFA 9-2 could be of configuration 3, EDFA 9-3 could be of configuration 4, and EDFAs 9-4 and 9-5 could be of configuration 2. In other situations and for other portions of the network, the number of EDFA configurations as well as their characteristics can be again different.

A drawback of such approach is that it requires having stacks of different amplifiers while building and servicing optical communication links, which greatly increases the costs of building and maintaining the network.

The problem is further exacerbated by a high cost and complexity of conventional EDFAs, which includes a multitude of optical and electronic components of different types. A typical prior-art EDFA includes one or more coils of erbium-doped fiber (EDF) as the gain medium, semiconductor lasers to pump the EDF, and discrete fiber-coupled components such as optical taps and WDM couplers, optical isolators, gain flattening filters (GFFs), and variable optical attenuators (VOAs), to properly couple and guide signal light and pump light. Fiber-coupled photodiodes (PDs) are used to measure input and output optical power levels. Fiber splicing is used to optically couple the components together. As a result, a typical prior-art EDFA has numerous fiber splices, splice protectors, discrete components, and optical fiber loops. The multitude of components and fiber loops make the conventional EDFAs complex and costly. Using prior-art technologies and approaches, reducing amplifier costs requires sacrificing EDFA performance characteristics such as the spectral gain tilt, flatness of the gain spectrum, and the noise figure of the EDFA, which is undesirable from the standpoint of maintaining a high level of technical performance.

US patent application 2009/0201576, which is referred to hereinbelow as the '576 application, has common inventors with the present application, is assigned to the assignee of the present application, and is incorporated herein by reference, discloses an EDFA build with the use of planar lightwave circuit (PLC) technology, wherein most of the EDFA components such as optical taps, pump splitters, optical isolators, monitoring PDs are build in or mounted on a PLC chip, and the EDF and pump diode lasers are coupled to the PLC by a fiber array, eliminating most of the fiber pigtails used in conventional EDFAs. This PLC-centered approach enables to reduce the size, cost and fabrication complexity of conventional EDFAs without sacrificing their performance.

Furthermore, the PLC-centered approach greatly reduces the cost of adding new components, enabling also use novel components not conventionally used in EDFAs, such as tunable spectral tilters and tunable optical power splitters, as described in the '576 application. The use of such variable splitter as a variable pump splitter in a PLC-centered EDFA of the '576 application enables an independent control of optical pumping of two EDFA stages using a single pump laser diode, reducing the amplifier cost or improving its characteristics as compared to conventional EDFAs.

An object of the present invention is to further improve upon the prior art optical amplifiers by providing an optical amplifier that is reconfigurable for use in a wide range of network requirements and locations, and is relatively simple to assemble.

SUMMARY OF THE INVENTION

Accordingly, the present invention relates to a reconfigurable optical amplifier (ROA), which comprises an input ROA port for receiving light signal, an output ROA port for outputting an amplified light signal, two photonic lightwave circuit (PLC) switches optically coupled in series for forming two switchable optical paths between the input and output ROA ports, wherein the two PLC switches are formed in a same PLC chip. A first fiber amplifier section (FAS) is optically coupled between the two PLC switches in one of the two switchable optical paths, while a second FAS is optically coupled between the two PLC switches in the other of the two switchable optical paths, or in a common portion of the two switchable optical paths, an optical pump source for generating pump light for pumping the first and second FASs. The ROA further comprises a variable pump splitter comprising an input port coupled to the optical pump source for receiving the pump light therefrom, and first and second output ports coupled to the first and second FASs, respectively, for controllably directing the pump light to pump one or both of the first and second FAS therewith.

One aspect of the invention provides a ROA, which comprises an input ROA port for receiving light signal, an output ROA port for outputting an amplified light signal, and first and second photonic lightwave circuit (PLC) switches optically coupled in series for forming two switchable optical paths between the input and output ROA ports, wherein the two PLC switches are formed in a same PLC chip. A first fiber amplifier section (FAS) optically coupled between the two PLC switches in a first of the two switchable optical paths, while a second FAS is optically coupled in a common portion of the two switchable optical paths in series with the first and second PLC switches. An optical pump source is further provided for generating pump light for pumping the first and second FASs. A variable PLC pump splitter is disposed with an input port coupled to the optical pump source for receiving the pump light therefrom, and first and second output ports optically coupled to the first and second FAS, respectively, for controllably directing the pump light to pump substantially only the second FAS or both the first and the second FAS therewith.

One aspect of the invention provides a ROA, which comprises first and second photonic lightwave circuit (PLC) switches optically coupled in series for forming two switchable optical paths between input and output ROA ports, wherein the two PLC switches are formed in a same PLC chip. A first fiber amplifier section (FAS) optically coupled between the two PLC switches in a first of the two switchable optical paths, while a second FAS is optically coupled between the two PLC switches in the other of the two switchable optical paths, wherein the switches are controllable to selectively direct the light signal from the input ROA port along either one of the first and second optical paths. An optical pump source is further provided for generating pump light for pumping the first and second FASs. A variable PLC pump splitter is disposed with an input port coupled to the optical pump source for receiving the pump light therefrom, and first and second output ports optically coupled to the first and second FAS, respectively, for controllably directing the pump light to pump substantially only the second FAS or both the first and the second FAS therewith.

According to an aspect of the present invention, the input and output ROA ports, input and output ports of the first and second FASs, and the optical pump source are all optically coupled to the PLC chip, the PLC chip further comprising one or more tap couplers for tapping off fractions of the optical signal for coupling into one or more photodetectors mounted thereto, and one or more WDM pump couplers for combining the pump light with the light signal, wherein the variable pump splitter is comprised in the same PLC chip or in a second PLC chip.

BRIEF DESCRIPTION OF THE DRAWINGS

The invention will be described in greater detail with reference to the accompanying drawings which represent preferred embodiments thereof, in which like elements are indicated with like reference numerals, and wherein.

DETAILED DESCRIPTION

Figure 1:
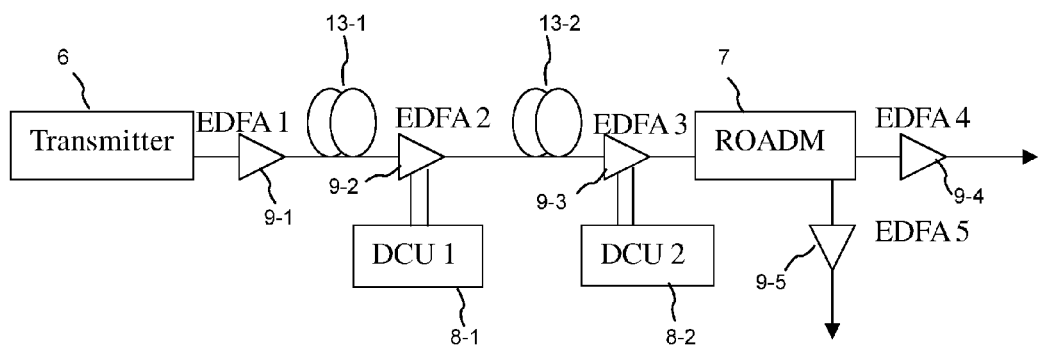
FIG. 1 is a schematic block diagram of a section of an optical transmission link according to prior art.

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

The term "circuit" in the context of the present specification means either a single component or a multiplicity of components, either active and/or passive, that are arranged to cooperate with one another to provide a desired function.

The terms "coupled" and "connected" are used interchangeably and mean either a direct connection of two elements without intermediary elements other than, possibly, an optical waveguide or waveguides in the case of optical coupling or connection, or a connection via one or more intermediary elements or circuits. The terms "directly connected" or "directly coupled" mean a connection, such as an optical connection, between two or more elements without intermediary elements other than optical waveguides or specific connecting means.

The term "signal" means at least one optical signal, electrical signal or data signal.

The terms "light" or "optical" and their variants refer to electromagnetic radiation in the visible, infrared or ultraviolet ranges, including at least the range between about 200 nanometers (nm) and about 2 micrometers (μm).

The terms "connected in series" or "coupled in series" in the context of this specification mean a connection of optical elements in which light propagates through these optical elements sequentially, one after another.

Exemplary embodiments of a reconfigurable optical amplifier (ROA) will now be described in detail with reference to block diagrams shown in FIGS. 3-10, wherein like elements are indicated with like reference numerals.

Figure 3:
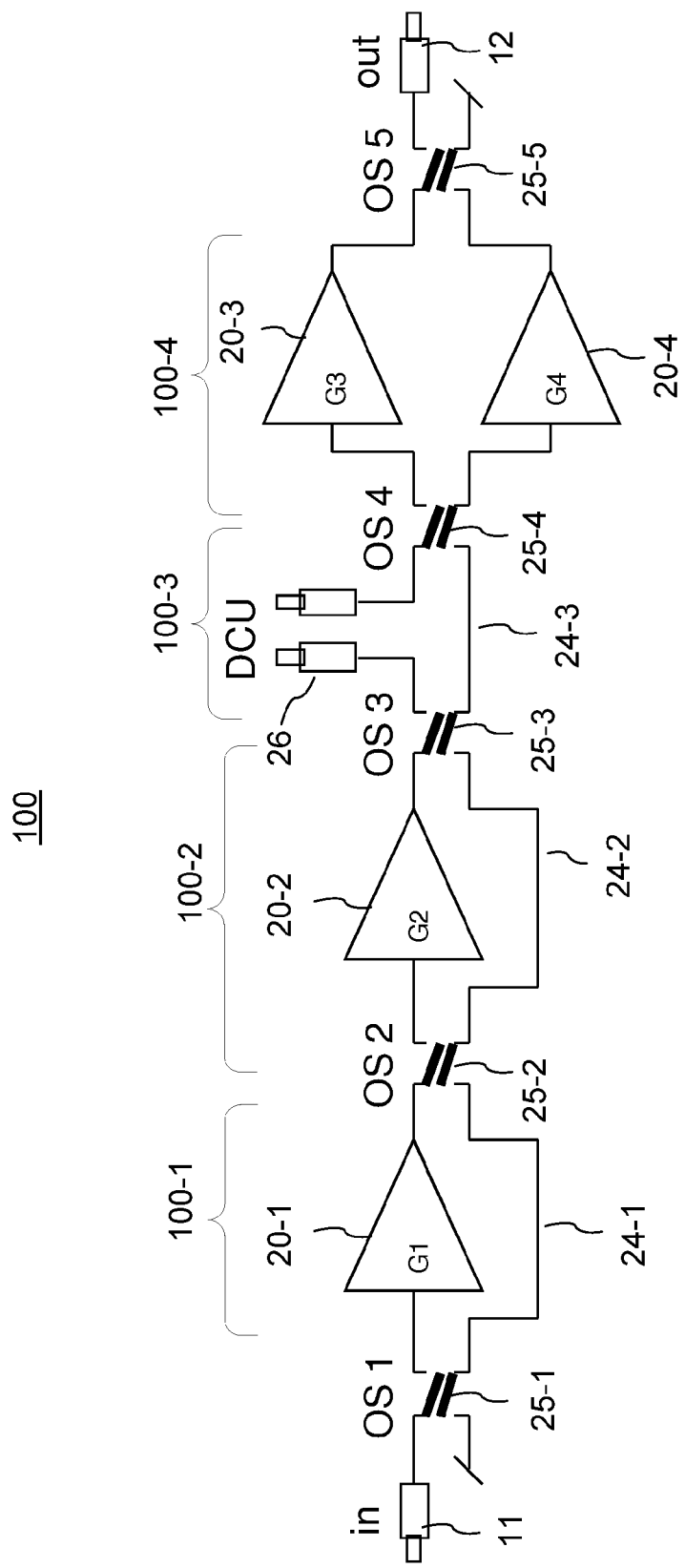
FIG. 3 is a schematic block diagram of a reconfigurable optical amplifier with five optical switches according to an embodiment of the present invention.

Referring first to FIG. 3, there is shown an optical circuit of a ROA 100 according to an exemplary embodiment of the present invention. The ROA 100 contains four gain stages 20-1 to 20-4, which are generally referred to as gain stages 20 or fiber amplifier sections (FAS) 20, connected via a network of five optical switches (OS) 25-1 through 25-5, generally referred to as switches 25. Each gain stage 20 includes a length of EDF or, generally, a length of a suitably doped fiber which, when pumped with suitable pump radiation, provides amplification for light of desired wavelengths propagating therein. For the sake of clarity, pumping of the gain stages 20 is not shown in the figure. Each gain stage 20 may also include a pump WDM (wavelength division multiplexing) coupler for launching pump radiation into the EDF. In other embodiments, pump WDM couplers may be outside of the gain stages 20, as described hereinbelow. In some embodiments, one or more of the gain stages 20 may also include a gain flattening filter (GFF), a variable optical attenuator (VOA), and other components as known in the art. The five switches 20 define four switchable amplifier sections (SAS) 100-1 to 100-4, wherein light signal may be directed to propagate along two or more different optical paths traversing differing optical elements. Depending on states of each of the optical switches 25, the ROA 100 may take different configurations, configurable to pass the light signal to be amplified through one, two or three consecutive gain stages for four different gain ranges with or without mid-stage access at 26. In particular, each of the first and second SASs 100-1, 100-2 may be configured as an amplifying stage or as a passive stage wherein the light signal is passed without amplification, the fourth SAS 100-4 is an amplifying stage with switchable gain and/or NF characteristics, and the third SAS 100-3 is a passive stage configurable to include or bypass the midstage access 26.

Figure 2:
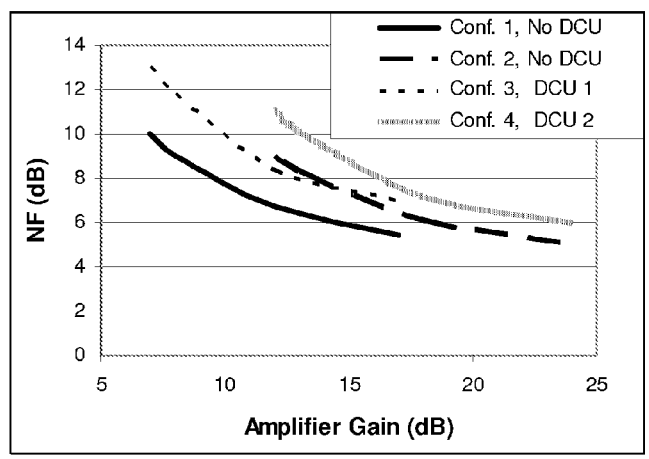
FIG. 2 is a graph showing amplifier gain versus noise figure characteristics for four exemplary EDFAs.
Figure 4:
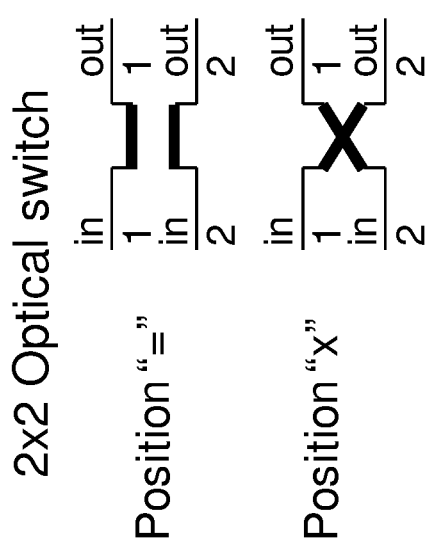
FIG. 4 is a schematic representation of optical connections in a 2×2 optical switch in a 'bar' and 'cross' states thereof.

Table 1 summarizes possible exemplary configurations of the amplifier 100 of FIG. 3 that may achieve gain/NF characteristics shown in FIG. 2. In the table, "x" and '=' refer to a 'cross' and 'bar' states of the optical switches 25, embodied as 2×2 switches, respectively, with OS1 to OS5 referring to optical switches 25-1 to 25-5, respectively. FIG. 4 illustrates corresponding optical connections for the two states within a switch 25 between a first input switch port 1, a second input switch port 2, a first output switch port 3 and a fourth output switch port 4 thereof. Each of the switches 25-2 to 25-4 has at least two input ports and two output ports, while switch 25-1 may have a single input port that is coupled to an input port 11 of the ROA 100, and two output switch ports. Switch 25-5 may have a single output switch port that is coupled to an output ROA port 12 of the ROA 100, and two input switch ports.

TABLE 1

| | | OS positions | | | | |
|---|---|---|---|---|---|---|
| Amp conf | DCU | OS1 | OS2 | OS3 | OS4 | OS5 |
| 1 | none | x | x | x | = | x |
| 2 | none | = | x | = | = | x |
| 3 | 6 | = | x | x | x | x |
| 4 | 12 | = | = | = | = | = |

In operation, an optical signal is launched into the ROA 100 via the ROA input port 11 and is passed to the first optical switch (OS1) 25-1, which can be set to pass the signal via a first output switch port thereof through the first gain stage 20-1 or via a second output switch port thereof to bypass the first gain stage 20-1 along a first bypass waveguide 24-1, which may optionally include non-amplifying optical elements (not shown). Either way, i.e. amplified or bypassed, the optical signal then travels to the second optical switch 25-2. A first input switch port of the OS 25-2 is optically coupled to an output of the first gain stage 20-1, while a second input switch port of the OS 25-2 is optically coupled to the distal end of the first bypass waveguide 24-1. The second OS 25-2 can be set to pass the optical signal to the second gain stage 20-2 or to bypass the second gain stage 20-2 via a second bypass waveguide 24-2. Again, either way, i.e. amplified or bypassed, the optical signal is transmitted to the third OS 25-3, which has a first input port optically coupled to the second gain stage 20-2, and a second input port optically coupled to the second bypass waveguide 24-2. The third OS 25-3 is set to direct the optical signal, via a first output switch port thereof, to mid-stage access ports 26 for passing through an external optical circuit or element (not shown) such as, for example, a dispersion compensation unit (DCU) that compensates for chromatic dispersion in a preceding and/or following optical transmission link, or to a third bypass waveguide 24-3 via a second output switch port to bypass the DCU. The mid-stage access ports 26 may also be used for connecting other devices or optical circuits such as but not limited to a ROADM, an external GFF, or an EDFA. A fourth OS 25-4 receives the optical signal at a first input switch port thereof from the DCU, or alternatively, at a second input switch port thereof from the third bypass waveguide 24-3. First and second output switch ports of the fourth OS 25-4 are optically coupled to a third gain stage 20-3 and a fourth gain stage 20-4, respectively, whereby the fourth optical switch 25-4 can be set to pass the optical signal through either the third or fourth gain stage 20-3 or 20-4, which have different amplification characteristics, for example to enable using DCUs having different insertion losses. By way of example, the third gain stage 20-3 may have a relatively higher gain G3 designed for a DCU with 12 dB insertion loss, while the fourth gain stage 20-4 may have a relatively lower gain G4 designed for a DCU with 6 dB insertion loss. The outputs of the third and fourth gain stages 20-3 and 20-4 are coupled to first and second input switch ports of a fifth OS 25-5, respectively, which is settable to direct the optical signal from either the third or fourth gain stage 20-3 or 20-4 to an output switch port thereof that is coupled to an output ROA port 12.

Figure 5:
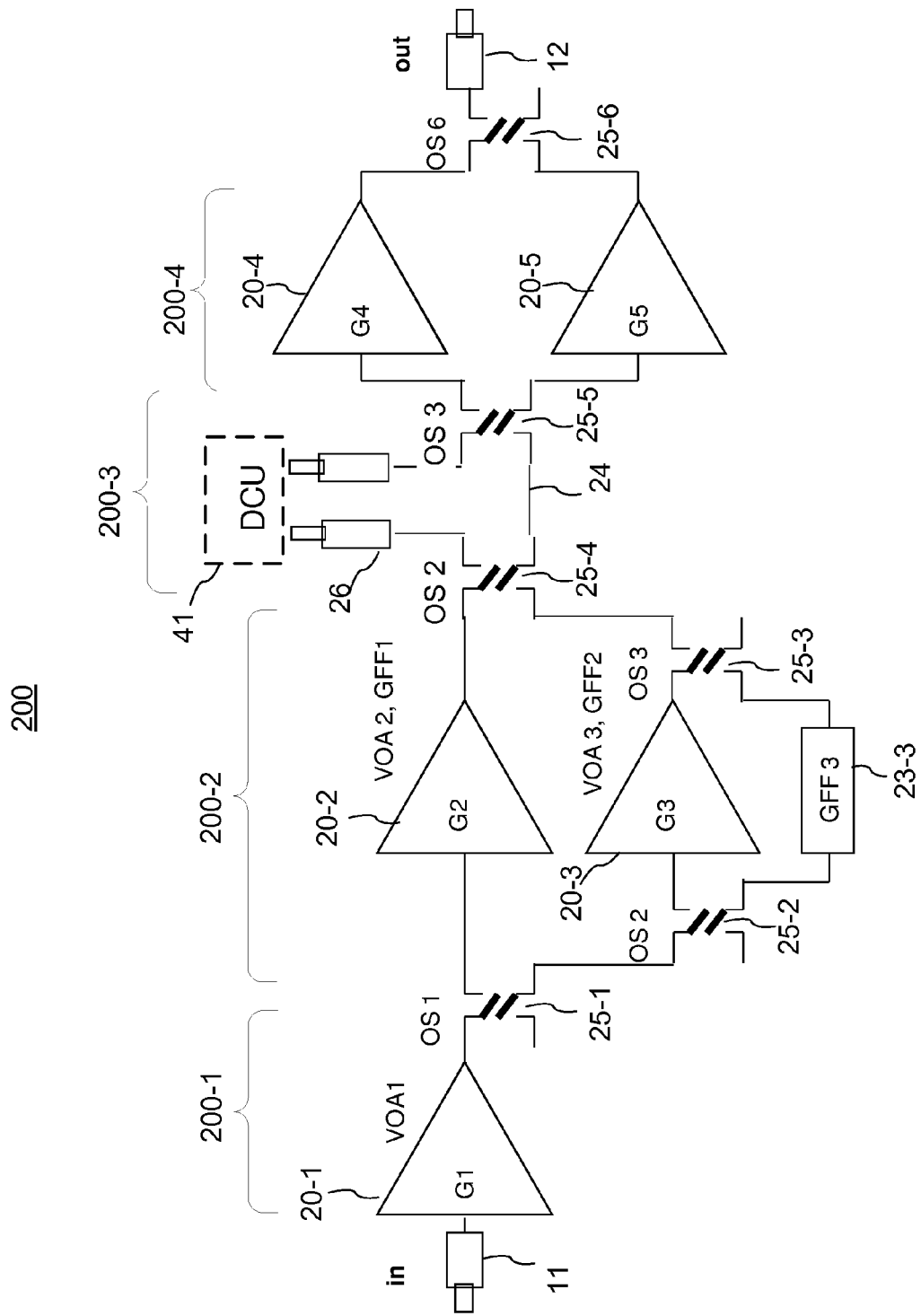
FIG. 5 is a schematic block diagram of a reconfigurable optical amplifier with six optical switches according to an embodiment of the present invention.

Referring now to FIG. 5, there is shown a ROA 200 in accordance with another exemplary embodiment of the present invention. The ROA 200 is a multi-stage amplifier wherein a first amplification stage 200-1 is followed by three SASs 200-2 to 200-4. The first SAS 200-2 is reconfigurable to pass the light signal along three different paths, two of which include a different gain stage each, 20-2 and 20-3, a VOA and a GFF (not shown), with a third being passive and including a GFF 23-3.

GFFs, also known as gain equalizing filters (GEFs), are typically used in conjunction with EDFs or optical Raman amplifiers to ensure that the amplified wavelength channels all have experienced approximately same net gain, so as to suppress intensity variations across the wavelength channels. Since the spectral profile of an optical gain provided by an EDF section depends on the EDF length and the pump power therein, different gain stages may require a different GFF.

A VOA is an optical component that adds a variable attenuation into an optical path that is generally independent on the wavelength of the optical signal. A VOA can be either an electrical or a manual attenuator. An electrical VOA typically includes a control port for receiving an electrical control signal which sets an attenuation value of the VOA, and is typically coupled to an electrical controlling unit. When VOA is a part of an optical amplifier, the amplifier can function as a variable gain amplifier, wherein average optical gain and spectral gain tilt can be controlled via VOA loss and pump power.

VOAs can employ a variety of technologies to control the optical attenuation. Currently, there are several types of commercially available VOAs in the market, including but not limited to opto-mechanical devices that use stepping motors, bulk magneto-optical crystals, liquid crystal (LC), micro-electro-mechanical systems (MEMS) based devices, and PLC-based devices (PLC VOA) such as those utilizing Mach-Zehnder interferometers formed with planar waveguides in a PLC chip. Advantageously, the PLC technology enables to integrate one or more VOAs with the optical switches, such as the OSs 25-1 to 25-4, in a single PLC chip, along with other optical elements of the ROA thus providing a highly integrated ROA device centered about a single, or in some cases few, PLC chips.

Compared to ROA 100, in the ROA 200 an optical switch at the input of the first gain stage 20-1 is absent, so that the input optical signal is transmitted directly to the first gain stage 20-1, which may improve the noise figure of the ROA by reducing its input optical loss. Six optical switches 25-1 to 25-6 make the ROA 200 to be configurable as either a two-stage EDFA or a three stage EDFA, i.e. to have either two or three amplification stages, configurable to have up to 6 different gain ranges and gain-NF combinations.

In the shown embodiment, all of the OSs 25-1 to 25-6 are 2×2 optical switches such as those described in the '576 Patent Application and illustrated in FIG. 6 hereinbelow. However, in other embodiment the input OS 25-1 may be in the form of a 1×2 switch with a single input switch port coupled to the input ROA port 11 and two output switch ports, while the output OS 25-6 may be replaced with a 2×1 optical switch with one output switch port coupled to the output ROA port 12. The optical switches 25-1 and 25-2 are connected in series in a switch network 25-1,2 so as to function as a 1×3 switch, and can be both replaced by a single 1×3 switch. Similarly, the switches 25-3 and 25-4 are 2×2 switches that are connected in a switch network 25-3,4 so as to effectively form a 3×2 switch, and can thus both be replaced by a 3×1 switch with three input switch ports, which are coupled to three respective output ports of the switch network 25-1,2 through respective optical elements. Accordingly, the switch networks 25-1,2 and 25-3,4 are configurable to direct the input optical signal from the input port 11 along three different paths therebetween, i.e. to pass either the second fiber amplifier section 20-2, the third fiber amplifier section 20-3, or via a non-amplifying optical connection including a GFF 23-3. Furthermore, the output switch ports of the OS 25-4 and the input switch ports of the OS 25-5 are configurable to either pass the optical signal through a DCU 41 to a first input switch port of the OS 25-5, or to bypass the DCU 41 for connecting directly to a second input switch port of the OS 25-5. The output switch ports of the OS 25-5 and the input switch ports of the OS 25-6 are configurable to either pass the optical signal through the fourth gain stage 20-4 or through the fifth gain stage 20-5, which may include different lengths of EDF or other types of doped amplifying fibers for providing different optical gains, or gains in different spectral ranges.

In operation, an input optical signal is launched from the input ROA port 11 directly to the first gain stage or FAS 20-1, which may include, or be followed or preceded by, a first variable optical attenuator VOA1. After being amplified in the first FAS 20-1, the optical signal is passed to the first OS 20-1, which has the first output switch port optically coupled to the second gain stage 20-2 optionally including a first gain flattening filter GFF1 and a second variable optical attenuator VOA2, and a second output switch port optically coupled to an input switch port of the second OS 25-2. The second OS 25-2 has a first output switch port optically coupled to the third gain stage 20-3, which optionally includes a second gain flattening filter GFF2 and a third variable optical attenuator VOA3, and further has a second output switch port optically coupled to the third gain flattening filter GFF3 23-3. The outputs of the third gain stage 25-3 and the third gain flattening filter 23-3 are optically coupled to the third optical switch 25-3, via first and second input switch ports thereof, while the output switch ports of the third optical switch 25-3 and the second gain stage 20-2 are optically coupled to the first and second switch input ports, respectively, of the fourth optical switch 25-4, whereby the optical signal can be directed from either the second gain stage 20-2, the third gain stage 20-3 or the third GFF 23-3, into one of two input switch ports of the fourth optical switch 25-4. A first output switch port of the fourth optical switch 25-4 is optically coupled, via mid-stage access interface 26 and the DCU 41, to a first input switch port of the fifth OS 25-5, while a second output switch port of the fourth optical switch 25-4 is optically coupled, via a bypass waveguide 24, to a second input switch port of the fifth OS 25-5, whereby the optical signal can be alternatively passed to the fifth OS 25-5 either directly or after first passing thought the DCU 41. A first output switch port of the fifth optical switch 25-5 is optically coupled to a fourth gain stage 20-4, while a second output of the fifth optical switch 25-5 is optically coupled to a fifth gain stage 20-5, whereby the fifth optical switch 25-5 can be set to direct the optical signal to either the fourth of fifth gain stages 20-4 or 20-5. The outputs of the fourth and fifth gain stages 20-4 and 20-5 are optically coupled to the first and second switch inputs of the sixth optical switch 25-6, respectively, whereby the optical signal can be directed from either of the fourth or fifth gain stages 20-4 or 20-5 to the output ROA port 12 via the output switch port of the sixth optical switch 25-6, to which the output ROA port 12 is optically coupled.

TABLE 2

| Amp conf | Gtotal | DCU | OS1 | OS2 | OS3 | OS4 | OS5 | OS6 |
|---|---|---|---|---|---|---|---|---|
| 1 | Gtot1 | none | x | x | x | = | = | x |
| 2 | Gtot2 | none | = | NA | NA | x | = | x |
| 3 | Gtot3 | 6 | = | NA | NA | = | x | x |
| 4 | Gtot4 | 12 | x | = | = | x | = | = |

Accordingly, ROA 200 can be configured with switches 25-1 to 25-6 into at least four different amplifier configurations, corresponding to four rows of the table 2. In the table, "x" and '=' refer to a 'cross' and 'bar' states of the optical switches 20, respectively, with corresponding optical connections within a switch illustrated in FIG. 4, and with OS1 to OS6 referring to optical switches 25-1 to 25-6, respectively, of FIG. 5. The four different amplifier configurations correspond to four different paths of the input optical signal through stages of the ROA 200.

While traveling the first optical path corresponding to the amplifier configuration '1' in the table, the optical signal is transmitted to the first gain stage 20-1 with optical gain G1 for amplification and processing by the first variable optical attenuator VOA1. Then the optical signal is directed by the first optical switch 25-1 to the second optical switch 25-2, which is set to direct the optical signal to the third gain flattening filter GFF3, and then to the third OS 25-3. The third OS 25-3 is set to direct the optical signal to the fourth optical switch 25-4, which is set to direct the optical signal directly to the fifth optical switch 25-5, thereby bypassing the DCU 41. The fifth optical switch 25-5 directs the optical signal to the output out port 12 via the fifth optical amplifier 20-5 with optical gain G5 and the sixth optical switch 25-6. Accordingly, in this configuration the ROA 200 has optical gain Gtot1=G1+G5−Loss1, wherein 'Loss1' represents total optical loss in all passive component along the first optical pass, including optical loss in the 6 OSs and GFF 23-3.

While traveling the second path corresponding to the amplifier configuration '2' in the table 2, the optical signal is transmitted from the input ROA port 11 to the first gain stage 20-1 for amplification and processing by the first variable optical attenuator VOA1. Then the optical signal is directed by the first optical switch 25-1 to the second gain stage 20-2 with optical gain G2, which includes a section of optically pumped EDF, the second variable optical attenuator VOA2 and the first gain flattening filter GFF1. The fourth optical switch 25-4 is set to direct the optical signal directly to the fifth optical switch 25-5, thereby bypassing the DCU 41. The fifth optical switch 25-5 directs the optical signal to the output ROA port 12 via the fifth optical amplifier 20-5 and the sixth optical switch 25-6. Accordingly, in this configuration the ROA 200 has optical gain Gtot2=G1+G2+G5−Loss2, wherein 'Loss2' represents total optical loss in all passive component along the second optical pass, including optical loss between respective input and output switch ports in the 6 OSs.

While traveling the third path corresponding to the amplifier configuration '3' in the table 2, the optical signal is transmitted first to the first gain stage 20-1 for amplification and processing by the first variable optical attenuator VOA1. Then the optical signal is directed by the first optical switch 25-1 to the second gain stage 20-2, which includes an optically pumped EDF, the second variable optical attenuator VOA2 and the first gain flattening filter GFF1. The fourth optical switch 25-4 is set to direct the optical signal through the DCU 41, which has a design optical loss 6 dB, to the fifth optical switch 25-5, which directs the optical signal to the output ROA port 12 via the fifth gain stage 20-5 and the sixth optical switch 25-6. Accordingly, in this configuration the ROA 200 has optical gain Gtot3=G1+G2+G5−Loss3, wherein Loss3 represents total optical loss in all passive component along the third optical pass, including optical loss in the 6 OSs and the DCU 41 (6 dB).

While traveling the fourth path corresponding to the amplifier configuration '4' in the table 2, the optical signal is transmitted to the first gain stage 20-1 for amplification and processing by the first variable optical attenuator VOA1. Then the optical signal is directed by the first optical switch 25-1 to the second optical switch 25-2, which is set to direct the optical signal to the third gain stage 20-3 with optical gain G3 including a length of optically pumped EDF, the third variable optical amplifier VOA3 and the second gain flattening filter GFF2, and then to the third OS 25-3. The third optical switch 25-3 directs the optical signal to the fourth optical switch 25-4, which is set to direct the optical signal to the DCU 41. After the DCU 41, which in this configuration has a design optical loss 12 dB thereby requiring a larger gain from the output amplifies stage, the fifth optical switch 25-5 directs the optical signal to the output ROA port 12 via the fourth gain stage 20-4 with optical gain G4>G5 and the sixth optical switch 25-6. Accordingly, in this configuration the ROA 200 has optical gain Gtot4=G1+G3+G4−Loss4, wherein Loss4 represents total optical loss in all passive component along the fourth optical pass, including optical loss in the 6 OSs and the larger-loss DCU 41 (12 dB).

FIGS. 3 and 5 generally illustrate optical circuits of the exemplary ROAs 100 and 200, which are formed by optical switches 25 for directing light signals along alternative optical paths to traverse different gain stages 20, other optional amplifier components and/or midstage access units, disposed in those paths. Each of the ROAs 100 and 200 has a relatively complex architecture, with multiple reconfigurable amplifier blocks, or SASs, each bound by complementary optical switches at the inputs and outputs thereof, so as to form multiple optical paths between the complimentary optical switches. Accordingly, the ROAs 100 and 200 can be viewed as optical amplification networks having optical switches as the network nodes and gain stages 20 or non-amplifying elements interconnecting the nodes. Advantageously, all the optical switches 25 can be implemented with planar waveguide structures formed in a single PLC chip, wherein many other EDFA elements such as VOAs and coupler can also be integrated, considerably simplifying the overall configuration of the ROAs even for a large number of switchable amplifier stages and OSs.

Figure 6A:
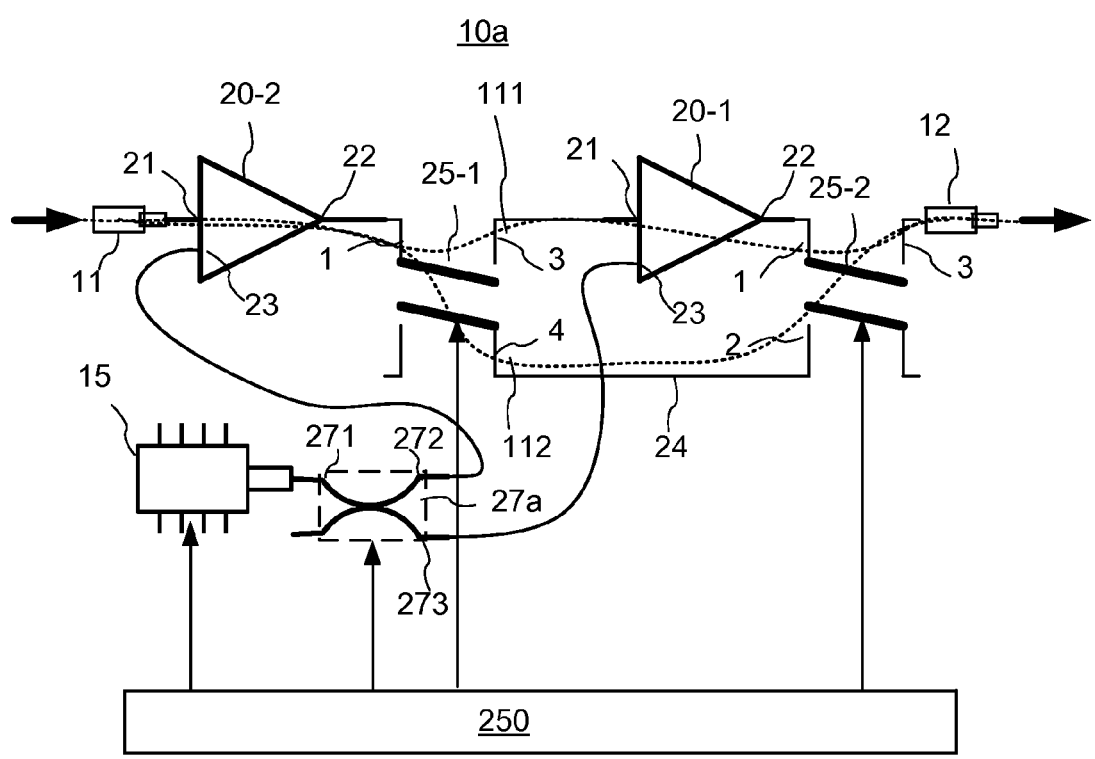
FIG. 6A is a schematic block diagram illustrating switchable pumping of a reconfigurable optical amplifier having a gain section in series with a single switchable amplifier section according to an embodiment of the present invention.
Figure 6B:
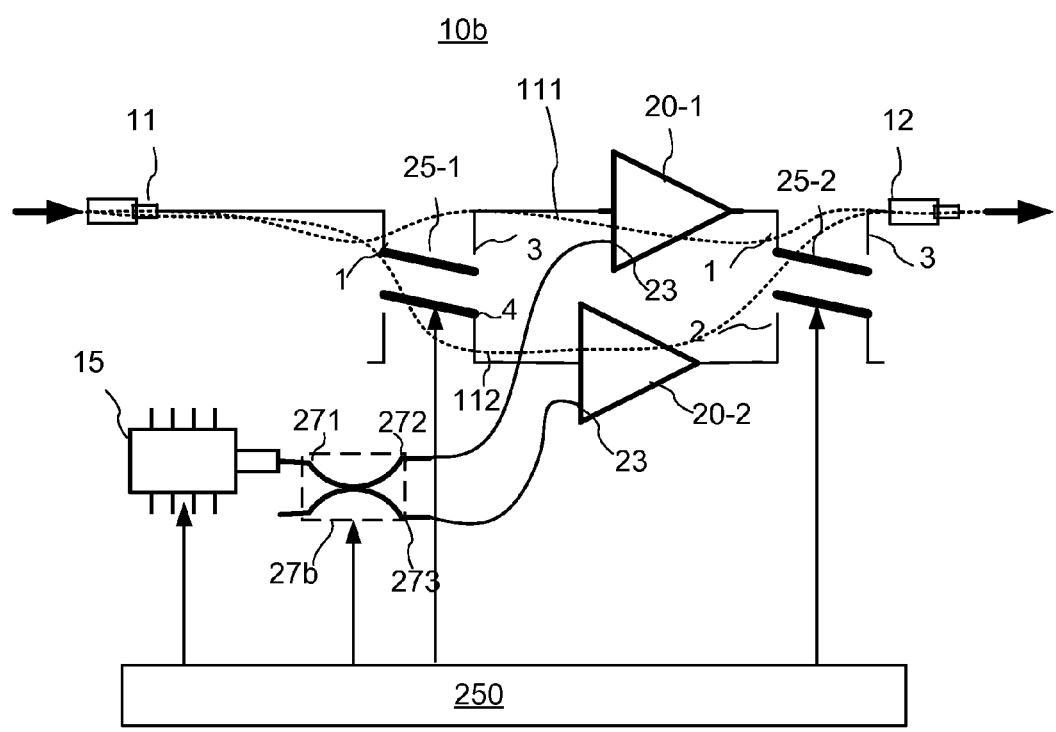
FIG. 6B is a schematic block diagram illustrating switchable pumping of a reconfigurable optical amplifier having a single switchable amplifier with two switchable gain sections according to an embodiment of the present invention.

Turning now to FIGS. 6A and 6B, there are shown exemplary ROAs 10a and 10b, respectively, according to further embodiments of the present invention. The ROAs 10a and 10b each include a single SAS and may be viewed as basic reconfigurable amplifier blocks, from which more complex ROA networks, including but not limited to those illustrated in FIGS. 3 and 5, may be constructed.

In each of the ROAs 10a and 10b, two optical switches 25-1 and 25-2 in the form of PLC switches are optically coupled in series for forming two switchable optical paths 111, 112 between the input and output ROA ports 11 and 12. A first gain stage 20-1, also referred to hereinafter as the first FAS (fiber amplifier section), is optically coupled between the two OSs 25-1 and 25-2 in one of the two switchable paths, namely the first switchable path 111. A second gain stage 20-2, also referred to as the second FAS 20-2, is further provided in both ROA 10*a* and 10*b*. In ROA 10*b* of FIG. 6B, the second FAS 20-2 is optically coupled between the two PLC switches 25-1, 25-2 in the other of the two switchable optical paths 112 between the two optical switches 25-1 and 25-2. In ROA 10*a* of FIG. 6A, the second FAS 20-2 is optically coupled in a common portion of the two switchable optical paths, namely in an optical link between the input ROA port 11 and the first of the two OSs 25-1. In another embodiment, the second FAS 20-2 may be optically coupled in another common portion of the two switchable optical paths 11, 112, namely in an optical link between the output ROA port 12 and an output switch port of the second of the two OSs 25-2.

FIGS. 6A and 6B further illustrate exemplary pumping and control schemes for reconfigurable pumping the gain stages 20-1 and 20-2 according to an aspect of the present invention for the two exemplary ROA embodiments. In these figures, horizontal arrows represent the optical signal entering and leaving the respective ROAs, while vertical arrows represent electrical control signals for controlling various elements of the ROAs. In each of the two shown configurations, the pumping scheme include an optical pump source 15 for generating pump light, and a variable pump splitter (VPS) 27*a* or 27*b*, generally referred to herein as VPS 27, for pumping the first and/or second gain stages 20-1 and 20-2. The optical pump source 15 may be embodied as a pump laser diode (LD), such as an LD for emitting the pump light at the wavelength of 980 nm suitable for pumping an EDF. In one embodiment, the LD 15 has an output port in the form of an optical fiber pigtail that is coupled to an input port 271 of the VPS 27, which has first and second output ports 271, 272 coupled to input pump ports 23 of the first and second gain stages 20-1 and 20-2, respectively. The VPS 27 is operable to controllably direct the pump light from the pump LD 15 with a variable output power splitting ratio to pump one or both of the first and second FAS 20-1 and 20-2. The control scheme of each of the ROAs 10*a*,*b* includes an electrical controller 250 that is electrically coupled to the pump LD 15, i.e. to an electrical driver thereof, for controlling the output power of the pump LD 15 by controlling a laser drive current flowing therethrough. The controller 250 is further electrically coupled to each of the optical switches 25 for switching thereof, and to the VPS 27 for controlling its operation such as varying the output power splitting ratio between the output ports 271, 272.

Referring to FIG. 6A in particular, in operation the ROA 10*a* can be switched by the controller 250 between two operating states by switching, preferably synchronously, VPF 27*a* and the OSs 25 between corresponding operating states thereof. In a first operating state of the ROA 10*a*, the first and second OSs 25-1,2 are both set in the 'cross' state directing the input optical signal along the second optical path 112 to bypass the first FAS 20-1, while the VPF 27*a* is set to a first state thereof wherein it directs substantially all of the pump radiation from the pump LD 15, less a fraction of the pump radiation lost in the VPS 27, to the second FAS 20-2, so that little or no pump light reaches the first FAS 20-1, i.e. the pump light is substantially blocked from pumping the first FAS 20-1. Here, the term "substantially blocked" means that the pump light from the second VPS output port 273 is insufficient to cause amplification in the first FAS 20-1, and is preferably constitutes less than 5%, and more preferably less than 1% of the pump radiation directed by the VPS 27 towards the second FAS 20-2. In a second operating state of the ROA 10*a*, the first and second OSs 25-1,2 are both switched to the 'bar' state directing the optical signal from the input ROA port 11 along the first optical path 111 to be amplified in the first FAS 20-1, while the VPF 27*a* is switched to a second state thereof wherein it splits the pump light in adjustable fractions between its two output ports 272, 273 and directs the adjustable fractions of the pump light to the first and second FAS 20-1 and 20-2 for pumping thereof. In addition to switching the VPS 27*a* between the two operating states, the intensity of the pump light may be adjusted by the controller 250 to pre-defined levels that are suitable for pumping either a single one of the first and second FASs 20-1 and 20-2, or both of them. For example, the controller 250 may signal to increase the laser drive current of the pump LD 15 when the ROA 10*a* is switched to the second state thereof wherein it operates as a two-stage amplifier passing the light signal through both the first and second FASs 20-1,2. Thus, a significant advantage over prior-art EDFAs is achieved, since independent control of the pumping conditions of FASs 20-1 and 20-2 results in improvement of EDFA performance characteristics, as is known to the one skilled in the art.

Referring to FIG. 6B in particular, in operation the ROA 10*b* can also be switched by the controller 250 between two operating states by switching synchronously the VPF 27*b* and the OSs 25 between corresponding operating states thereof. In a first operating state of the ROA 10*b*, the first and second OSs 25-1,2 are both in the 'cross' state directing the input optical signal along the second optical path 112 to be amplified in the second FAS 20-2 while bypassing the first FAS 20-1, while the VPF 27*b* is set to a first state thereof wherein it directs substantially all of the pump light that reaches the output ports of the VPS, i.e at least 95%, and preferably more than 98% thereof, to the second FAS 20-2, so that little or no pump light reaches the first FAS 20-1. In a second operating state of the ROA 10*b*, the first and second OSs 25-1,2 are both switched to the 'bar' state directing the optical signal from the input ROA port 11 along the first optical path 111 to be amplified in the first FAS 20-1 while bypassing the second FAS 20-2, while the VPF 27*b* is switched to a second state thereof wherein it directs substantially all of the pump light from its output via the first output port 272 to the first FAS 20-1, so that little or no pump light reaches the second FAS 20-2. In addition to switching the VPS 27*b* between the two operating states, the intensity of the pump light may be adjusted to pre-defined levels that are suitable for pumping either one of the first and second FASs 20-1 and 20-2, which may include differing lengths of EDF and thus require differing pumping levels, resulting in generally different ROA gain and NF. Note that in this mode of operation, the VPS 27*b* is operated as a conventional 1×2 switch directing substantially all of the input pump light to either of the two output ports 272, 273. Accordingly, in this mode of operation at least, the VPS 27*b* is also referred to hereinafter as the optical pump switch.

Figure 7:
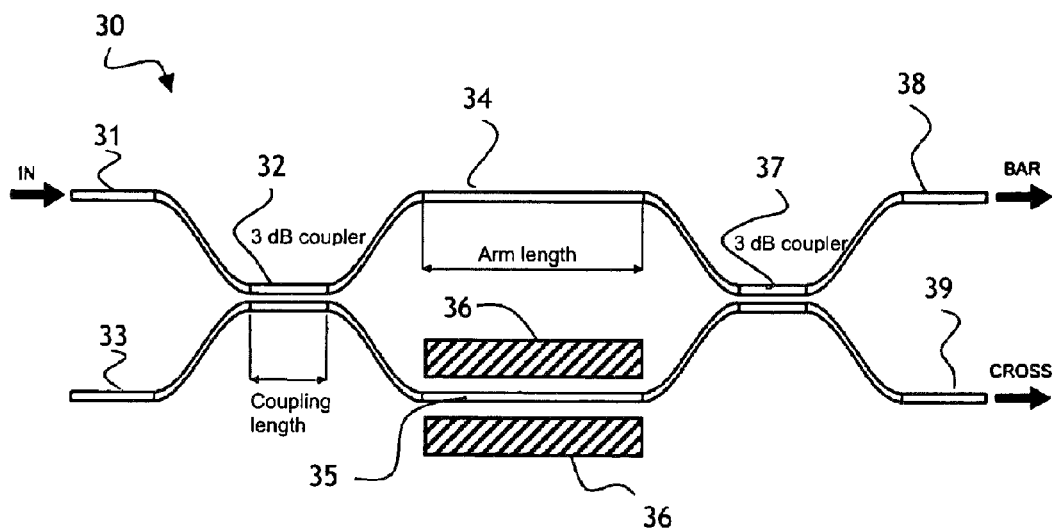
FIG. 7 is a plan view of a tunable planar lightwave circuit (PLC) Mach-Zehnder interferometer used in a tunable pump power splitter and optical switches according to an embodiment of the present invention.

Referring to FIG. 7, the VPS 27 may be conveniently embodied using PLC technology in the form of a tunable Mach-Zehnder interferometer (MZI) 30 formed with planar waveguides, as described in the '576 patent application. In the PLC MZI 30, the pump light from the single pump LD 15 is coupled to an input waveguide 31. The pump light travels towards a first 3 dB coupler 32 consisting of two waveguides, the waveguide 31 and a waveguide 33, brought together so that evanescent coupling of guided light modes between the waveguides 31 and 33 can occur along a coupling length, as indicated in FIG. 3. The coupler 32 is a 3 dB coupler, that is, 50% of light is coupled to a branch 34, and 50% of light is coupled to a branch 35. The optical path length of the branch 35 defined as the physical path length multiplied by an effective refractive index along the path, is modified by a heater 36 disposed adjacent to the branch 35. When the heater 36 changes the temperature of the branch 35, the local refractive index changes due to thermal dependence thereof, which effectively changes the optical path length of the branch 35. The light guided by the waveguide branches 34 and 35 is coupled again by a second 3 dB evanescent coupler 37. Since optical coupling by an evanescent coupler is a coherent process, the fraction of pump light going to a "bar" output waveguide 38 and to a "cross" output waveguide 39 of the splitter 30 depends on the optical path length variation in the branch 35 that is dependent on local temperature created by the local heater 36. Therefore, by applying a control signal to the heater 36, in the form of an electrical current, one can effectively tune the optical power splitting ratio of the splitter 30 splitting the available pump power between two optical paths represented by the waveguides 38 and 39, which may correspond to the output ports 272, 273 of the VPS 27a,b in FIGS. 6A and 6B, with the input waveguide 31 corresponding to the input port 271 of the VPS 27.

Advantageously, the same basic PLC MZI structure can be used for each of the OSs 25, which direct the light signal along alternative optical paths in the ROA of the present invention. Alternatively, all or some of the OSs 25 may be embodied using other suitable PLC structures capable of operating as optical switches. According to an aspect of the present invention, the OSs for switching the input light signal to be amplified may all be formed in a single PLC chip, with one or more VPSs 27 formed in the same or different PLC chips.

FIGS. 8A to 8C and 8E schematically illustrate PLC chips for use in the ROA 10a with various degrees of integration of optical components thereof according to embodiments of the present invention.

Figure 8A:
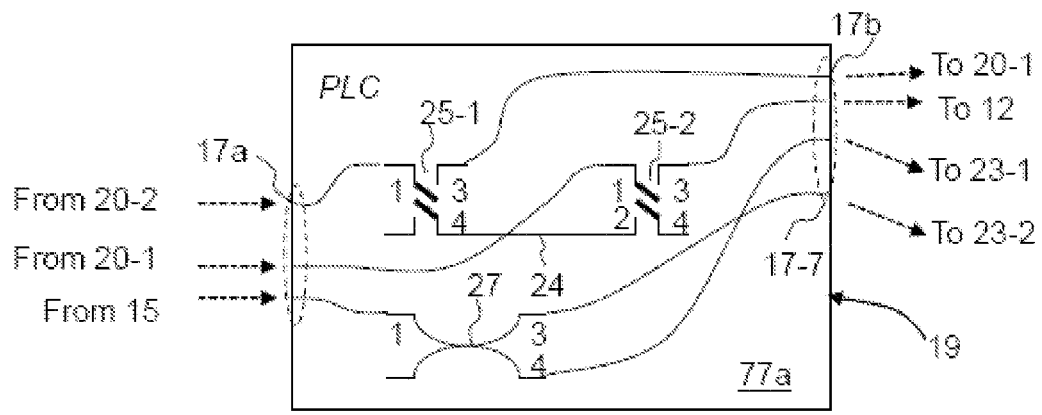
FIGS. 8A, 8B, and 8C are schematic plane views of different embodiments of a PLC chip for use in the reconfigurable optical amplifier of FIG. 6A.

Referring first to FIG. 8A, there is schematically shown a PLC chip 77a wherein the first and second OSs 25-1,2 and the VPS 27a of the ROA 10a of FIG. 6a are formed according to an embodiment of the present invention. In the shown embodiment, the first and second OSs 25-1,2 are each in the form of a 2×2 PLC switch, such as the PLC MZI 30 of FIG. 7, with a second input switch port of the first PLC switch 25-1 and a second output switch port of the second PLC switch 25-2 being unused; in other embodiments, 1×2 and 2×1 PLC switches can be used instead. An input switch port 1 of the first PLC switch 25-1, a first output switch port 3 of the first PLC switch 25-1, a first input switch port 1 of the second PLC switch 25-2, and a first output switch port 3 of the second PLC switch 25-2 are each coupled to a surface 19 encompassing the PLC chip 77a, by means of a planar waveguide ending at an optical interface 17a,b of the PLC chip, for coupling to the input ROA port 11 via the second FAS 20-2, an input end 21 of the first FAS 20-1, an output end 22 of the first FAS 20-1, and the output ROA port 12, respectively.

Figure 9A:
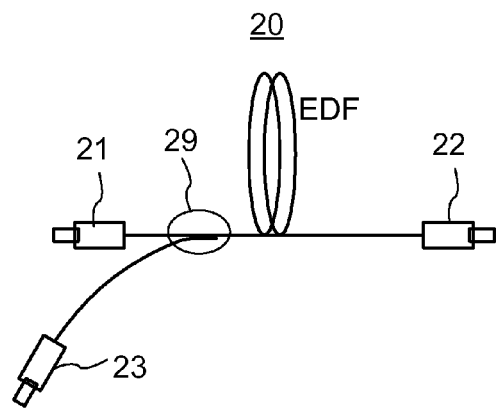
FIGS. 9A and 9B are schematic diagrams of a single fiber amplifier section according to two embodiments of the present invention.

Referring to FIG. 9A, each of the first and second FASs 20-1,2 in this embodiment includes a suitably doped optical fiber 46 such as a length of EDF, and a pump WDM coupler 29, which can be a separate bulk optical element as known in the art, or a PLC device. In one embodiment the pump WDM coupler is a 1550 nm/980 nm coupler for multiplexing light with the wavelength in the 1550 nm range with the pump light in the 980 nm wavelength range.

Turning back to FIG. 6A, the second FAS 20-2 has its input 'signal' port 21 coupled to the input ROA port 11, and its output 'signal' port 22 coupled to the PLC chip 77a for launching the optical signal from its output into the input port 1 of the first PLC switch 25-1. The second output switch port 4 of the first PLC switch 25-1 is optically connected to the second input switch port 2 of the second PLC switch 25-2 with a planar waveguide, which may optionally incorporate one or more other optical components including but not limited to a VOA, a tap coupler, an a GFF.

The PLC chip 77 also includes the VPS 27 formed therein, with the input port 1, first output port 2 and second output port 3 thereof coupled, with planar waveguides, to the optical interface 17a,b at the chip's surface 19 for connecting to the pump LD 15 and the pump ports 23 of the first and second FASs 20-1 and 20-2, respectively.

Figure 8B:
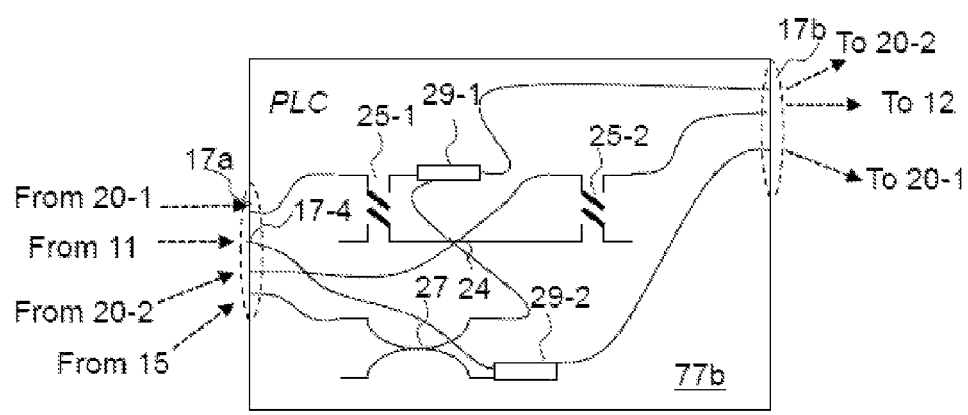

Referring now to FIG. 8b, there is schematically shown a PLC chip 77b according to an embodiment of the present invention; it differs from the PLC chip 77a of FIG. 8A in that it further integrates, in addition to the first and second OSs 25-1,2 and the VPS 27a, first and second pump WDM couplers 29-1 and 29-2. In one embodiment, the pump WDM couplers are evanescent couplers formed of two waveguides with a coupling region therebetween, such as the coupling regions 32 and 37 in FIG. 7, which exploit the dependence of a coupling length on the wavelength as known in the art; by way of example, the coupling region is designed to couple the pump light at the pump wavelength, e.g. 980 nm, from a first waveguide into the second waveguide at the middle of the coupling region, and to couple it back into the first waveguide at the end of the coupling region, while the optical signal at the optical signal wavelength, e.g. 1550 nm, is coupled from the second waveguide into the first waveguide at the end of the coupling region, at which point it is combined with the pump light.

Figure 9B:
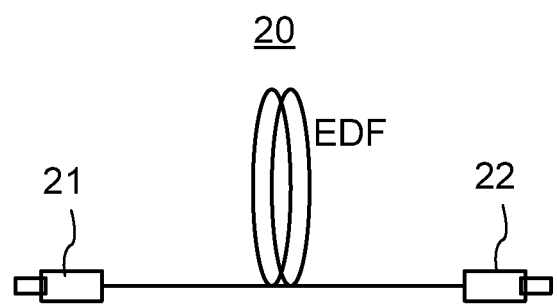

In the embodiment of FIG. 8b, the first and second FASs 20-1,2 may each consists of, substantially, a length of EDF 46 or other suitably doped fiber, with the opposing ends thereof serving as the input and output signal ports 21, 22 of the respective FAS, as illustrated in FIG. 9B. Optionally, one or both of the first and second FASs 20-1,2 may also include other optical elements such as taps, VOAs, GFFs, optical isolators etc., as known in the art. Further in this embodiment, the input ROA port 11, the input and output signal ports 21, 22 of the first and second FASs 20-1, 20-2 are all optically connected to the surface 19 of the PLC chip 77b for launching the light signal into a signal input port of the second pump WDM coupler 29-2, receiving the light signal mixed with the pump light from the second pump WDM coupler 29-2, launching the light signal amplified in the first FAS 20-1 into the first input port of the PLC switch 25-1, receiving the light signal from the first output port of the PLC switch 25-1, and launching the light signal amplified in the second FAS 20-2 into the first input port of the second PLC switch 25-2.

Figure 8C:
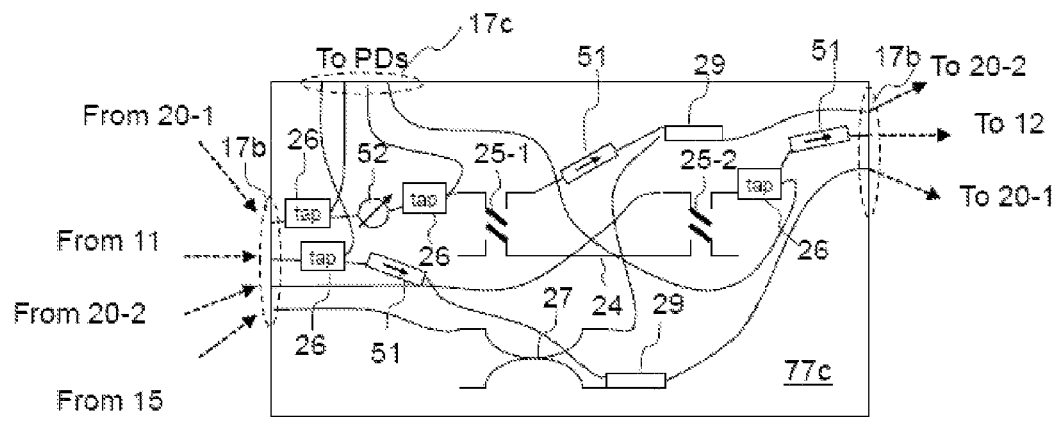

Turning now to FIG. 8C, there is schematically shown a PLC chip 77c according to a further embodiment of the present invention, which differs from the PLC chip 77b of FIG. 8B in that it further integrates, in addition to the first and second OSs 25-1,2 and the VPS 27a, first and second pump WDM couplers 29-1 and 29-2, four tap couplers 26, and three optical isolators 51, and a VOA 52; these elements and their integration within a PLC chip have been described in the '576 application. In particular, the tap couplers 26 are PLC couplers for tapping off small fractions, for example 5% to 1%, of the light signal at a first input into the PLC chip, at a last output therefrom, at the input into the first PLC switch 25-1, and at the input and output of the VOA 52, and for directing the tapped-off portions to a second optical interface 17c of the PLC chip 77c for coupling into respective photo-detectors, which can be for example in the form of a photodiode array coupled optically and mechanically to the PLC chip 77c as described in the '576 application incorporated herein by reference. In the embodiment of FIG. 8c, the first and second FASs 20-1,2 each consists of, substantially, a length of EDF 46 or other suitably doped fiber, with the opposing ends thereof serving as the input and output signal ports 21, 22 of the respective FAS, as illustrated in FIG. 9B, without including other optical elements such as taps, VOAs, GFFs, optical isolators etc., other than, possibly, for coupling to the PLC chip.

Continuing to refer to FIG. 8C, the VOA 52 is coupled at the input port of the first PLC switch 25-1; its purpose may be, for example, to tune gain, gain slope and/or NF characteristics of the ROA. In another embodiment, a VOA can be inserted in the waveguide 24 providing the second optical path 112, see e.g. FIG. 6a, for suppressing multi-path interference when the PLC switches 25 are in the 'bar' state for directing light along the first optical path 111. In one embodiment, the VOA 52 is in the form of variable tilter-variable optical attenuator (VT-VOA) based on two imbalanced PLC MZIs connected in series, as described in detail in the '576 application with reference to FIGS. 6 to 9 thereof.

The optical isolators 51 may be in the form of PLC devices, for example a PLC device described in "PLC-Optical circulator and isolator based on blazed diffraction grating" by Sonobe, L. Fujita, H. in Transducers, Solid-State Sensors, Actuators and Microsystems, 2003, which is incorporated herein by reference, or may be embodied as a multi-port free space optical isolator attached to a side surface of the PLC chip as described in the '576 application, see e.g. FIGS. 11A and 11B thereof.

Figure 8D:
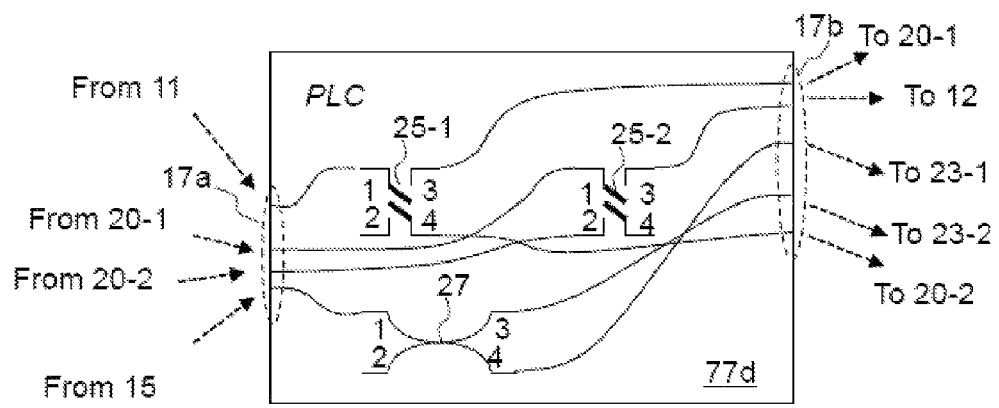
FIG. 8D is a schematic plane view of a PLC chip for use in the reconfigurable optical amplifiers of FIG. 6A or 6B according to an embodiment of the present invention.

Referring now to FIG. 8D, there is illustrated a PLC chip 77d that can be used both in the ROA 10a, wherein the first and second OSs 25 are disposed in consecutive stages of the ROA, and in the ROA 10b wherein they are disposed in a same stage of the ROA for switching therebetween. The PLC chip 77d differs from the PLC chip 77a in that in the PLC chip 77d, the second output switch port 4 of the first PLC switch 25-1 and the second input switch port 2 of the second PLC switch 25-2 are both coupled to the surface 19 of the PLC chip. In the ROA 10b, they are coupled by means of the second FAS 20-2, which has its input and output signal ports optically connected to the PLC 77d as schematically illustrated in FIG. 8D with arrows respectively labelled "From 20-2" and "To 20-2". In the ROAs 10a and 10b, the second output switch port 4 of the first PLC switch 25-1 and the second input switch port 2 of the second PLC switch 25-2 are coupled to the surface 19 of the PLC chip, and further optically coupled to each other with an optical fiber link which is external to the PLC chip 77 and optionally includes one or more other optical components such as a VOA, a tap, or a GFF. One skilled in the art will appreciate that the PLC chips 77b and 77c can be easily adopted for use in the ROA 10b by removing the waveguide 24 connecting the second output switch port 4 of the first PLC switch 25-1 and the second input switch port 2 of the second PLC switch 25-2, and by adding planar waveguide coupling these ports to the surface 19 of respective PLC chips.

The optical interface 17a,b of the PLC chips 77a to 77d, although shown in FIGS. 8A to 8D as divided in two portions 17a and 17b for receiving and outputting light, respectively, which are located at different faces of the PLC chip 77, may in other embodiments be located at a same face of the PLC chip, or formed as a single optical interface, such as a microlens array coupling or, alternatively, butt coupling the PLC chip to a single fiber array connecting to the first and second FAS 20-1,2 and the output ROA port 12, in a manner described in the '576 application with reference to FIGS. 11A, 11B and 13 thereof.

Figure 8E:
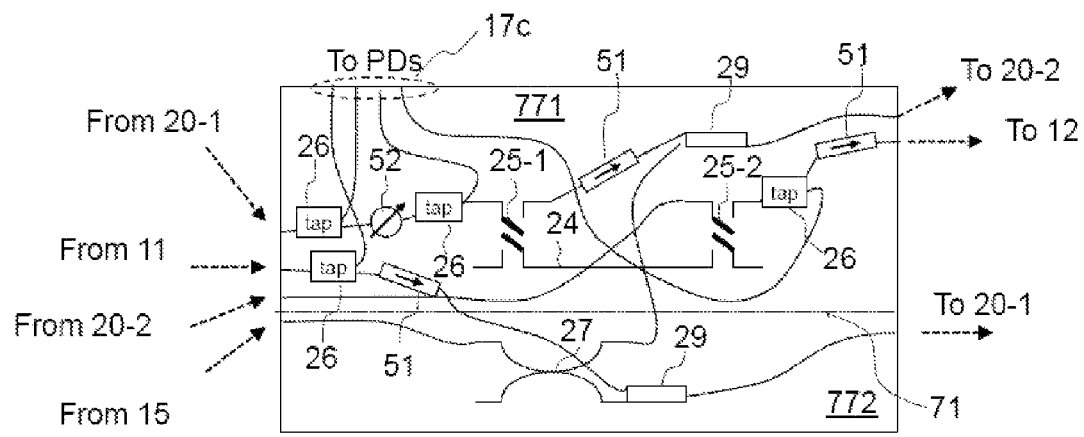
FIG. 8E is a schematic plane view of a PLC of FIG. 8C implemented in two PLC chips according to an embodiment of the present invention.

Referring now to FIG. 8E, in some embodiment it may be convenient to have the PLC switches 25 formed in a first PLC chip 771, and have the VPS 27 formed in a second PLC chip 772, as schematically illustrated with a dotted line 71 dividing the PLC into two chips. The first and second PLC chips 771, 772 may be optically coupled using optical fiber patches or butt-coupled and mounted on a same carrier.

Figure 10:
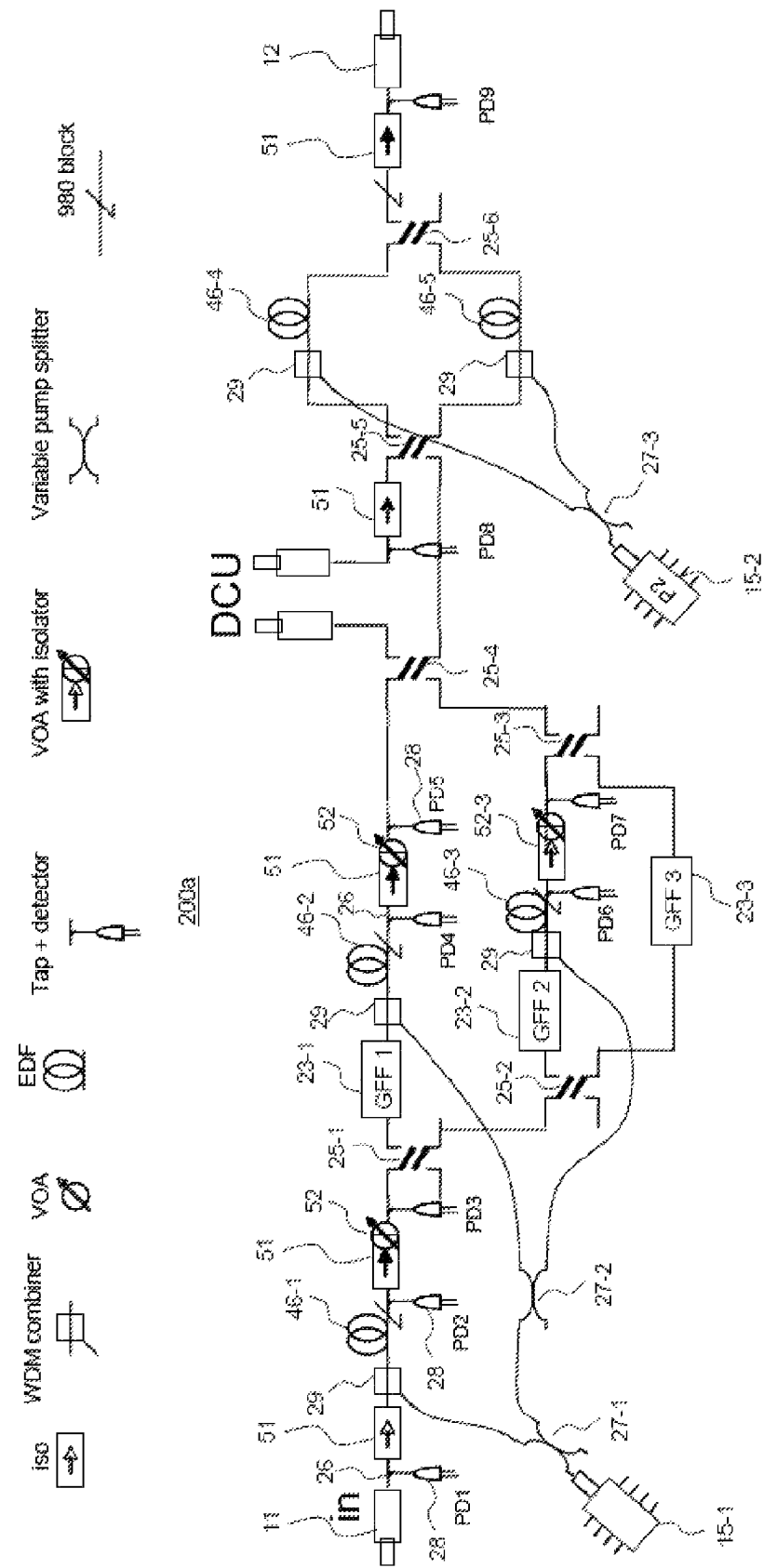
FIG. 10 is a schematic optical diagram of one implementation of the reconfigurable optical amplifier of FIG. 5 with three variable pump splitters.

Referring now to FIG. 10, there is illustrated a more detailed optical diagram of an exemplary ROA 200a, which may be viewed as a particular implementation of the ROA 200 of FIG. 5. Comparing with the optical circuit of the ROA 200 illustrated in FIG. 5, the first amplifier stage 200-1 and amplifying links in each of the first, second, and third SAS 200-2 to 200-4 includes a pump WDM 29 and a FAS in the form of an EDF coil 46-1 to 46-5, respectively. Each of the first, second and third EDF coils 46-1, 46-2, and 46-3 is followed by an optical isolator 51 and a VOA 52. There are three switchable optical paths between the first OS 25-1 and the fourth OS 25-4, each of which including a GFF denoted with reference numerals '23-1', '23-2', and '23-3', respectively. Tap couplers 26 with tap outputs coupled to respective photodiodes 28 are further provided at various points in the optical circuit of the ROA 200a for monitoring the light signal at the input ROA port 11, the output ROA port 12, at the outputs of EDF coils 46-1 to 46-5, and at the outputs of the VOAs 52 and at the mid-stage access point.

In the shown embodiment, only two pump LDs are used to pump the 5 EDF coils 46-1 to 46-5. A first pump LD 15-2 is optically coupled using two VPSs 27-1 and 27-2 and corresponding pump WDM couplers 29 to inject the pump light into the first EDF coil 46-1 and, optionally, into one of the second and third EDF coils 46-2 and 46-3, respectively, depending on a current state of the OSs 25-1 and 25-2. The two VPS 27-1 are embodied as 1×2 PLC splitters, and may be replaced by a single 1×3 variable PLC splitter for variably splitting the pump light from LD 15-1 between three output ports for pumping any one, two or three of the EDFs 46-1, 46-2 and 46-3. A second pump LD 15-2 is optically coupled by means of a third VPS 27-3 and two pump WDM couplers 29 to selectively inject pump light into one of the fourth and fifth EDF coils 46-4 and 46-5. The second VPC 27-2 and the third VPS 27-3 may each operate as a 1×2 switch, directing the pump light from a respective input port to either one of two output ports thereof for selectively pumping one of two EDF coils.

According to an embodiment of the present invention, all of the optical switches 25-1 to 25-5, tap couplers 26, pump WDM couplers 29, VOAs 51, and VPSs 27-1 to 27-2 may be PLC devices integrated in a single PLC chip with the EDF coils 46-1 to 46-5 and PDs 28 optically coupled thereto, as was described hereinabove with reference to FIG. 8C. The optical isolators 51 may be embodied using a multiport bulk optical isolator that is side-mounted to the PLC chip as described in the '576 application. The GFFs 23-1 to 23-3 may be implemented either with PLC structures, or for example using thin film filters also side mounted on the PLC chip as described in the '576 application, or otherwise as known in the art.

In another embodiment, it may be advantageous to have all of the optical switches 25-1 to 25-5 implemented in one PLC chip, which may be optimized for the wavelength range of the optical signal being amplified, for example ~1550 nm, while the VPSs 27-1 to 27-3 implemented in a separate PLC chip, which may be optimized for the wavelength range of the pump light, for example ~980 nm.

In the aforedescribed embodiments, the gain stages, or FASs, 20 may be based not only on EDF but on other types of amplifying optical fibers as well, that is, optical fibers doped with suitable rare earth elements, such as ytterbium doped fibers used for amplifying light at a wavelengths of approximately 1050+−30 nm.

Figure 11:
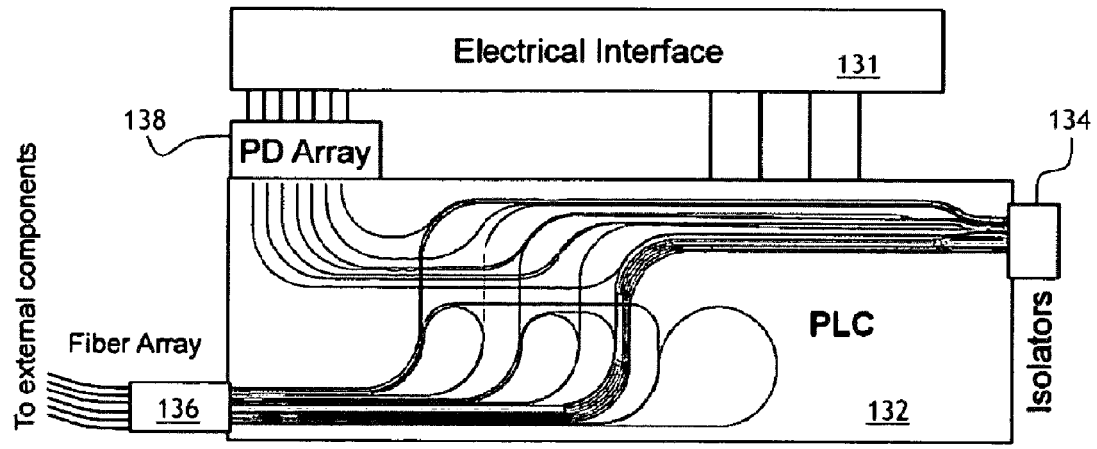
FIG. 11 is a plan view of a PLC reconfigurable optical fiber amplifier according to an embodiment of the present invention.

Turning now to FIG. 11, a packaging of the ROA 200 of FIG. 10 is illustrated according to an embodiment of the present invention. The tap couplers 26, pump WDM couplers 29, VOAs 52, GFFs 23-x, the 2×2 PLC switches 25 and the variable pump splitters 27 are planar structures disposed on a single PLC chip 132 of FIG. 11. The isolators 51 of FIG. 10 are a single multiport isolator 134 side-mounted to the PLC chip 132, similar to the isolator described in the '576 application (see FIGS. 11A and 11B thereof). The nine PDs 28 of FIG. 10 are embodied with a single photodiode array 138 side-mounted to the PLC chip 132. The remaining optical components of the optical train of FIG. 10, that is, doped fiber coils 46-1 to 46-5, pump LDs 15-1 and 15-2, the input port 11, and the output port 12 are coupled to optical fibers that are spliced to a single fiber array 136 side-mounted to the PLC 132. An electrical interface 131 receives the photocurrents from the photodiode array 138 and provides electrical signals from the controller 250 (see FIGS. 6a,b) for controlling the tunable pump splitters 27, the PLC switches 25, and the VOAs 52. In another embodiment, the GFFs 23-x are side mounted as described in the '576 application.

Different types of lasers can be used as the pump laser diodes 15, including but not limited to single-emitter semiconductor lasers, fiber-coupled multi-emitter laser bars, multi-laser diodes. Furthermore, a second pump laser can be coupled to one or both of the splitters 27-1 and 27-3 if required, for example to "back up" the laser 15 and therefore to increase the overall reliability of the fiber amplifier 120.

Advantageously, a same PLC chip wherein a plurality of PLC switches 25 and VPSs 27 are formed can be used as a centerpiece of large variety of ROA configuration. For example, a PLC chip with six or more 2×2 planar optical switches 25 and three or more VPSs 27 may be used as the centerpiece of the ROAs 100, 200, 10a and 10b, as well as a plurality of other ROA configurations such as those illustrated in FIGS. 12A to 12D, by connecting inputs and outputs of a specified number of fiber amplifier sections 20, e.g. in the form of EDF coils 46, to an optical interface of the PLC chip so as to connect to inputs and/or outputs of selected PLC switches, and optionally using external fiber-optic patches to couple inputs and outputs of various PLC elements to form a desired optical circuit.

Figure 12A:
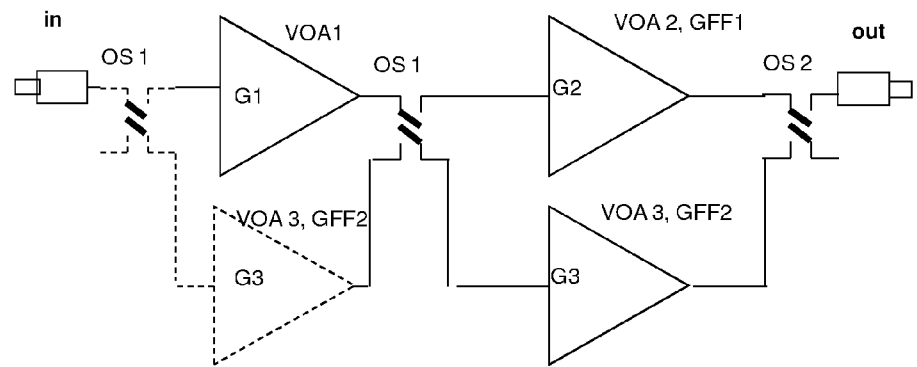
FIGS. 12A to 12E are schematic block diagrams illustrating optical circuits of various reconfigurable optical amplifiers according to exemplary embodiments of the present invention.
Figure 12B:
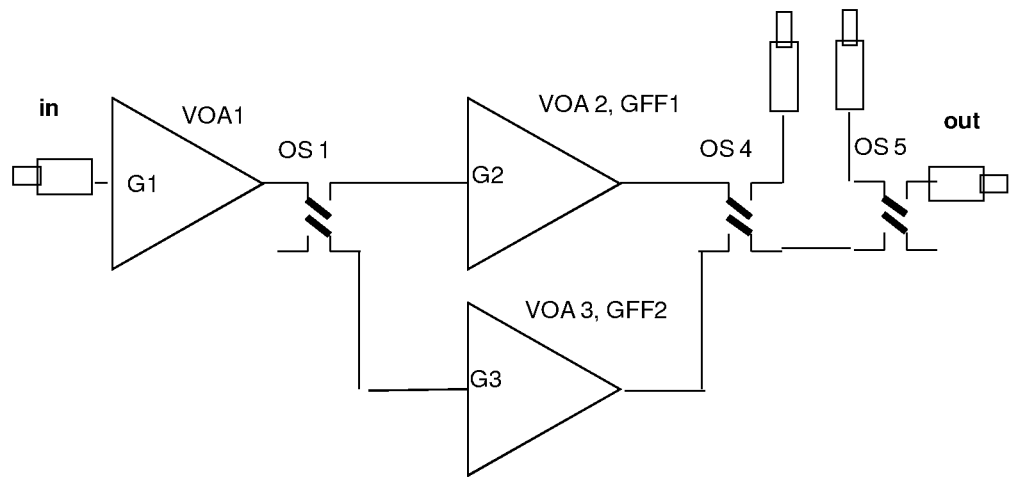
Figure 12C:
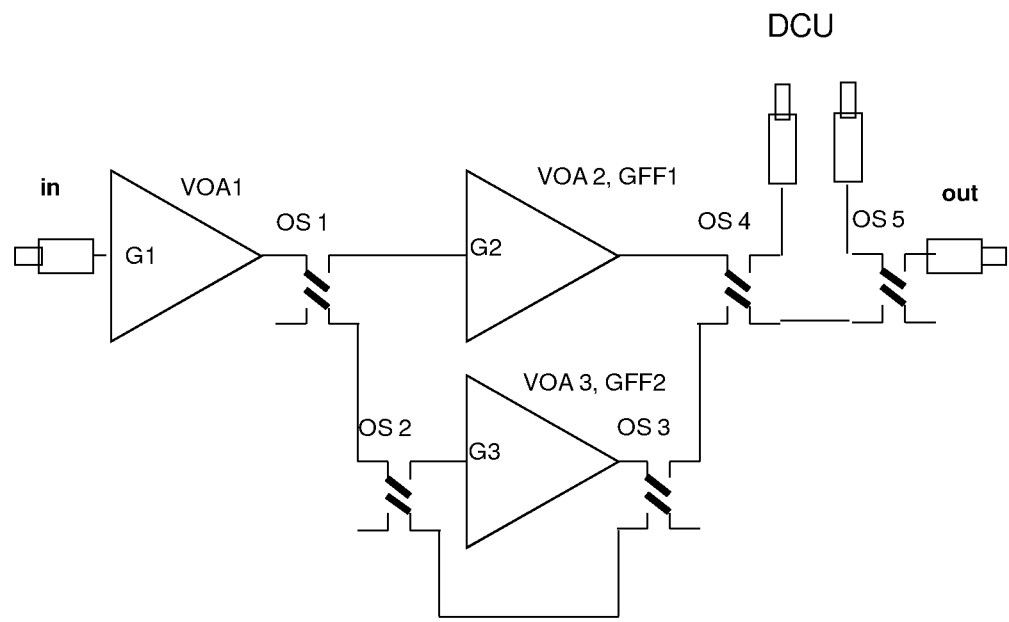
Figure 12D:
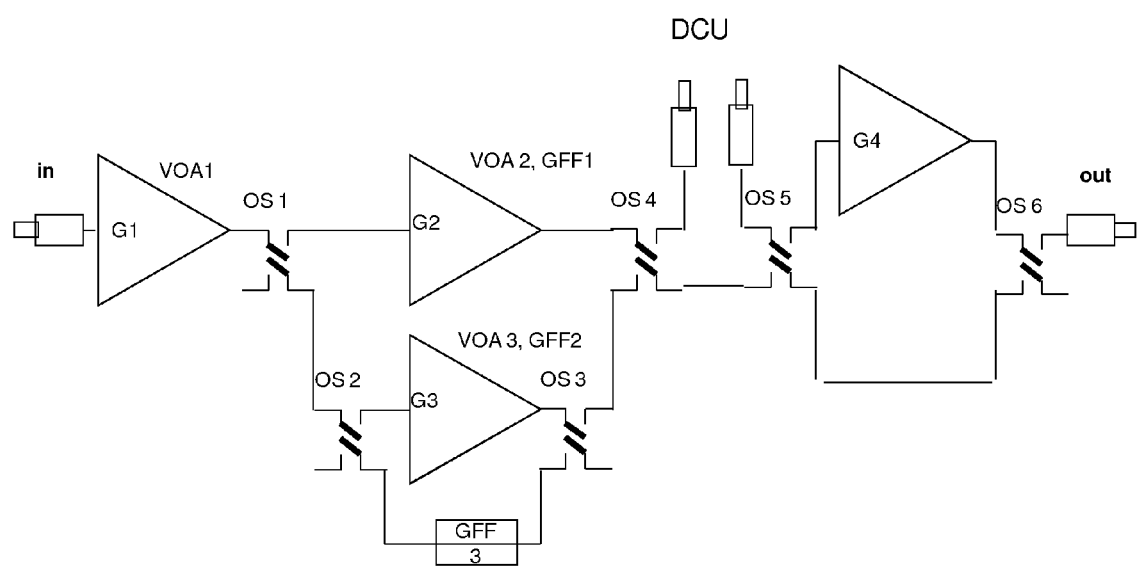

Referring by way of example to FIG. 12A, a two-stage ROA shown in this figure is, substantially, two switchable amplifier sections of the ROA 10b connected in series, and may be formed by coupling three 2×2 PLC switches in series using two pairs of FASs having design optical gains G1 and G3, and G2 and G3, respectively. The ROA of FIG. 12B can be formed by coupling a FAS with an optical gain G1 and a VOA between an input port of the PLC switch 25-1 of the ROA 10b, and further coupling a third PLC switch to an output of the second PLC to form a midstage access SAS such as SAS 200-2 or 100-3. The ROA of FIG. 12 D is, substantially, the ROA of FIG. 10 with a fiber patch replacing the fifth FAS 20-5.

Figure 12E:
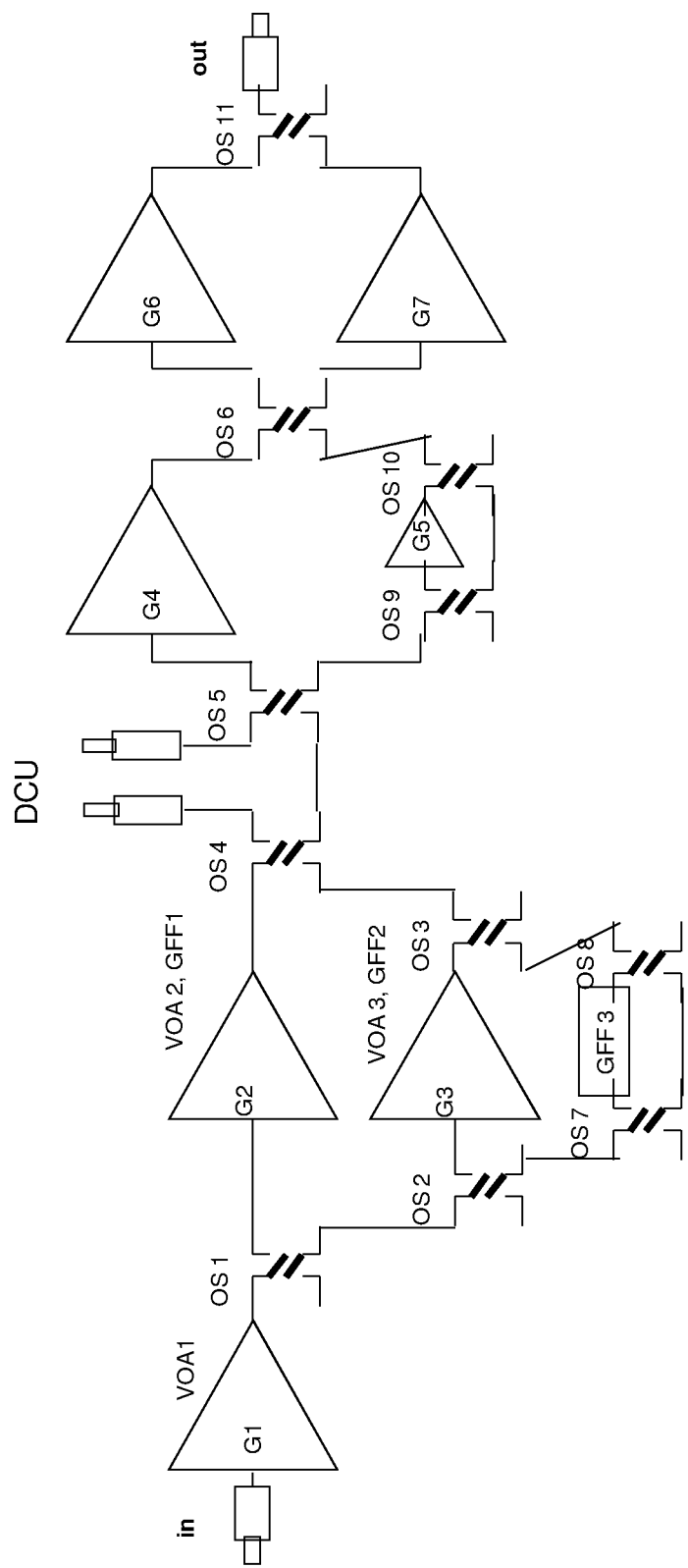

PLC chips with larger number of switches and VPSs may be used as centerpieces of ROAs of a more complex architecture, enabling more flexibility and wide application range. Since an incremental cost of adding a switch and/or a VPS structure in a PLC may be quite low, PLCs with a relatively large number of elements defined therein may be advantageous to manufacture for use in a wide variety of ROAs. By way of example, FIG. 12E illustrates a ROA requiring 11 PLC switches, which may be formed based on ROA 200 by coupling the third GFF 23-3 labeled 'GFF3' between input/output switch ports of a pair of complimentary PLC switches 'OS7" and 'OS8' to enable bypassing the GFF3, and by adding another three-position SAS between the mid-stage SAS 200-2 and the output SAS 200-3 of the ROA 200. This ROA is configurable to provide up to 48 different ROA configurations, from a two-stage amplifier without a mid-stage access to a four-stage amplifier with a mid-stage access.

According to an aspect of the present invention, each of the ROAs 100, 200, 10a, 10b, 200a may be assembled according to an exemplary assembly procedure having the following steps:

(a) splicing fiber coupled optical elements, including the pump laser or lasers 15 and the EDF coils 46, to the fiber array 136;

(b) setting the PLC switches 25 and the VPSs 27 in one of the specified configurations, such as those listed in tables 1 and 2 for the ROAs 100 and 200, 200a;

(c) aligning the fiber array 136, the photodetector array 138, and the multi-port isolator 134 to a side surface of the PLC 132 along the perimeter of the PLC 132, so as to: produce the photocurrents by the photodiodes 28; amplify light coupled to the input port 11; and couple the amplified light to the output port 12;

(d) attaching the fiber array 136, the photodetector array 138, and the multi-port isolator 134 to the side surface of the PLC 132.

It should be noted that various embodiments described herein may utilize features of the other embodiments, and many variations thereof would be apparent to a skilled reader. Of course numerous other embodiments may be envisioned without departing from the scope of the invention.

We claim:

1. A reconfigurable optical amplifier (ROA), comprising:
an input ROA port for receiving light signal;
an output ROA port for outputting an amplified light signal;
two photonic lightwave circuit (PLC) switches optically coupled in series for forming two switchable optical paths between the input and output ROA ports, wherein the two PLC switches are formed in a same PLC chip;
a first fiber amplifier section (FAS) optically coupled between the two PLC switches in one of the two switchable optical paths;
a second FAS optically coupled between the two PLC switches in the other of the two switchable optical paths, or in a common portion of the two switchable optical paths;
an optical pump source for generating pump light for pumping the first and second FASs; and,
a variable pump splitter comprising an input port optically coupled to the optical pump source for receiving the pump light therefrom, and first and second output ports coupled to the first and second FASs, respectively, for directing the pump light to variably pump one or both of the first and second FAS therewith in dependence upon switching states of the first and second PLC switches.

2. The ROA of claim 1, further comprising
a controller electrically coupled to each of the two PLC switches and the variable pump splitter for synchronously switching thereof between a first switch state and a second switch state, wherein:
in the first switch state the light signal is directed to pass through the first FAS, and at least a fraction of the pump light is directed to pump the first FAS, and in the second switch state the light signal is directed to bypass the first FAS, and the pump light is substantially blocked from pumping the first FAS.

3. The ROA of claim 1, wherein the two PLC switches and the variable pump splitter are all comprised in the same PLC chip.

4. The ROA of claim 1, wherein:
a first PLC switch of the two PLC switches comprises an input switch port and first and second output switch ports,
a second PLC switch of the two PLC switches comprises first and second input switch ports and an output switch port, and
the input switch port of the first PLC switch, the first output switch port of the first PLC switch, the first input switch port of the second PLC switch, and the output switch port of the second PLC switch are each coupled to a surface of the PLC chip for coupling to the input ROA port, an input end of the first FAS, an output end of the first FAS, and the main output port, respectively.

5. The ROA of claim 4, wherein:
the second FAS is optically coupled between the input ROA port and the input switch port of the first PLC switch; and,
the PLC chip comprises a planar optical waveguide optically coupling the second output port of the first PLC switch and the second input port of the second PLC switch for forming one of the two optical paths.

6. The ROA of claim 4, wherein:
the second FAS is optically coupled between the input ROA port and the input switch port of the first PLC switch, and
the second output switch port of the first PLC switch and the second input switch port of the second PLC switch are each optically coupled to the surface of the PLC chip;
the ROA further comprising a fiber-optic link coupling the second output port of the first PLC switch to the second input port of the second PLC switch.

7. The ROA of claim 6, wherein the fiber-optic link comprises at least one of a gain flattening filter (GFF) and a dispersion compensation unit (DCU).

8. The ROA of claim 4, wherein the PLC chip further comprises a pump WDM coupler for combining the light signal from the first output switch port of the first PLC switch with the pump light from the first output port of the variable pump splitter.

9. The ROA of claim 8, wherein the PLC chip further comprises a plurality of tap couplers for tapping off fractions of the light signal propagating in the PLC chip at a plurality of locations in the at least one of the first and second optical paths, and for coupling said fractions to a face of the PLC chip for coupling to a plurality of photodiodes.

10. The ROA of claim 8, wherein the PLC chip further comprises one or more variable optical attenuators (VOA) for controllably attenuating the light signal propagating therein.

11. The ROA of claim 8, further comprising a multiport optical isolator that is optically and mechanically coupled to a side face of the PLC chip for suppressing backward-propagating light.

12. The ROA of claim 8, wherein the first and second FAS each comprises a length of doped optical fiber that is doped for amplifying the light signal when pumped with the pump light.

13. The ROA of claim 8, wherein the first and second FAS each consists essentially of a length of doped optical fiber that is optically and mechanically coupled to the PLC chip at both ends thereof, wherein the doped optical fiber is doped for amplifying the light signal when pumped with the pump light.

14. A reconfigurable optical amplifier (ROA), comprising:
an input ROA port for receiving light signal;
an output ROA port for outputting an amplified light signal;
two photonic lightwave circuit (PLC) switches optically coupled in series for forming two switchable optical paths between the input and output ROA ports, wherein the two PLC switches are formed in a same PLC chip;
a first fiber amplifier section (FAS) optically coupled between the two PLC switches in one of the two switchable optical paths;
a second FAS optically coupled between the two PLC switches in the other of the two switchable optical paths;
an optical pump source for generating pump light for pumping the first and second FASs; and,
a PLC pump switch comprising an input port coupled to the optical pump source for receiving the pump light therefrom, and first and second output ports coupled to the first and second FASs, respectively, for switchably directing the pump light to pump one of the first or the second FAS therewith.

15. A reconfigurable optical amplifier (ROA), comprising:
an input ROA port for receiving light signal;
an output ROA port for outputting an amplified light signal;
first and second photonic lightwave circuit (PLC) switches optically coupled in series for forming two switchable optical paths between the input and output ROA ports, wherein the two PLC switches are formed in a same PLC chip;
a first fiber amplifier section (FAS) optically coupled between the two PLC switches in a first of the two switchable optical paths;
a second FAS optically coupled in a common portion of the two switchable optical paths in series with the first and second PLC switches;
an optical pump source for generating pump light for pumping the first and second FASs; and,
a variable pump splitter comprising an input port coupled to the optical pump source for receiving the pump light therefrom, and first and second output ports optically coupled to the first and second FAS, respectively, for controllably directing the pump light to pump substantially only the second FAS or both the first and the second FAS therewith.

16. The ROA of claim 15, further comprising a third FAS optically coupled between the two PLC switches in a second of the two switchable optical paths, wherein the variable pump splitter is further coupled to the third FAS for switchably pumping thereof when the light signal is directed along the second switchable optical path.

17. The ROA of claim 15 wherein the second PLC switch comprises first and second output switch ports, the PLC chip further comprising a third PLC switch comprising a first input switch port for optically coupling to the first output switch port of the second PLC switch, a second input switch port optically coupled to the second output switch port of the second PLC switch, and an output switch port optically coupled to the output ROA port.

18. The ROA of claim 17 wherein the first output switch port of the second PLC switch and the first input switch port of the third PLC switch are optically coupled to a face of the PLC chip for connecting an external optical device or circuit therebetween.

* * * * *